United States Patent
Raghavan et al.

(10) Patent No.: US 11,924,802 B2
(45) Date of Patent: Mar. 5, 2024

(54) FREQUENCY DEPENDENT BEAM PATTERNS FOR POSITIONING

(71) Applicant: QUALCOMM Incorporated, San Diego, CA (US)

(72) Inventors: Vasanthan Raghavan, West Windsor Township, NJ (US); Sony Akkarakaran, Poway, CA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 17/081,534

(22) Filed: Oct. 27, 2020

(65) Prior Publication Data
US 2022/0132459 A1    Apr. 28, 2022

(51) Int. Cl.
*H04W 64/00* (2009.01)
*G01S 5/02* (2010.01)
*G01S 5/04* (2006.01)

(52) U.S. Cl.
CPC ......... *H04W 64/003* (2013.01); *G01S 5/0236* (2013.01); *G01S 5/0252* (2013.01); *G01S 5/04* (2013.01)

(58) Field of Classification Search
CPC ...... H04W 64/003; G01S 5/0252; G01S 5/04; G01S 5/0236
See application file for complete search history.

(56) References Cited

U.S. PATENT DOCUMENTS

| 2019/0178976 A1* | 6/2019 | Xiong | H04W 64/00 |
| 2020/0178202 A1 | 6/2020 | Edge et al. | |

(Continued)

FOREIGN PATENT DOCUMENTS

| EP | 3537798 A1 * | 9/2019 | H04B 7/0695 |
| WO | WO-2021036773 A1 * | 3/2021 | H04B 7/0626 |
| WO | WO-2021103037 A1 * | 6/2021 | G01S 5/0284 |

OTHER PUBLICATIONS

Huawei: "(TP to BL CR for TS 38.455) Beam Pattern Report for AoD Calculation in DL-AOD", R3-202051, 3GPP TSG-RAN3 Meeting #107-bis-e , 3rd Generation Partnership Project, Mobile Competence Centre, 650, Route Des Lucioles, F-06921 Sophia-Antipolis Cedex, France, vol. RAN WG3, No. Online Meeting, Apr. 20, 2020-Apr. 30, 2020, Apr. 9, 2020, XP051870576, 4 Pages.

(Continued)

*Primary Examiner* — Muthuswamy G Manoharan
(74) *Attorney, Agent, or Firm* — SUNSTEIN LLP/Qualcomm

(57) ABSTRACT

Techniques are provided for enabling user equipment (UE) positioning based on base station side angle estimation in millimeter wave (mmW) bands. An example method for determining positioning information with a mobile device includes receiving positioning assistance data including beam pattern information for a plurality of reference signals associated with at least two sub-bands, receiving at least one of the plurality of reference signals within a sub-band, and determining an angle of departure value for at least one of the plurality of reference signals based at least in part on the positioning assistance data for the sub-band.

44 Claims, 17 Drawing Sheets

(56) References Cited

U.S. PATENT DOCUMENTS

2020/0314793 A1    10/2020  Kumar et al.
2022/0006561 A1*  1/2022  Golitschek Edler Von Elbwart ............... H04B 7/0456

OTHER PUBLICATIONS

International Search Report and Written Opinion—PCT/US2021/048360—ISA/EPO—dated Jan. 7, 2022.

Qualcomm Incorporated: "Assistance Data for DL-Only UE-Based Mode", 3GPP TSG-RAN WG2 Meeting #107, R2-1909424_(Assistance Data for UE-Based), 3rd Generation Partnership Project, Mobile Competence Centre, 650, Route Des Lucioles, F-06921 Sophia-Antipolis Cedex, France, vol. RAN WG2, No. Prague, CZ, Aug. 26, 2019-Aug. 30, 2019, Aug. 16, 2019, XP051767224, 15 pages.

Qualcomm Incorporated: "Beam Squint Analysis for FR2 UEs", R4-2006781, 3GPP TSG-RAN WG4 Meeting #95-e , 3rd Generation Partnership Project, Mobile Competence Centre, 650, Route Des Lucioles, F-06921 Sophia-Antipolis Cedex, France, vol. RAN WG4, No. Online; May 1, 2020, May 15, 2020, XP051883826, 16 Pages.

* cited by examiner

FREQUENCY DEPENDENT BEAM PATTERNS FOR POSITIONING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services client (LSC) may desire to know the location of the UE and may communicate with a location center in order to request the location of the UE. The location center and the UE may exchange messages, as appropriate, to obtain a location estimate for the UE. The location center may return the location estimate to the LSC, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. The antenna arrays for high frequency wireless networks may be required to cover a wide bandwidth. The fixed element spacing in the antenna arrays may reduce the array gain in portions of the bandwidth and degrade the accuracy of the reference signals and the corresponding positioning measurements.

SUMMARY

An example method for determining positioning information with a mobile device according to the disclosure includes receiving positioning assistance data including beam pattern information for a plurality of reference signals associated with at least two sub-bands, receiving at least one of the plurality of reference signals within a sub-band, and determining an angle of departure value for at least one of the plurality of reference signals based at least in part on the positioning assistance data for the sub-band.

Implementations of such a method may include one or more of the following features. A location based at least in part on the angle of departure value may be determined. The sub-band may be an active bandwidth part utilized by the mobile device. The sub-band may be a resource bandwidth within an active bandwidth part utilized by the mobile device. The sub-band may be a set of resource blocks received by the mobile device. The sub-band may be a component carrier of the plurality of reference signals. The plurality of reference signals may be downlink positioning reference signals. The positioning assistance data may include gain and direction information of at least one of a main lobe, side lobes, beam nulls, and grating lobes of each of the plurality of reference signals. A second reference signal in a second sub-band may be received and determining an angle of departure for the second reference signal may be based at least in part on a frequency associated with the second sub-band.

An example method of determining a location of a mobile device according to the disclosure includes receiving array gain information from a base station, the array gain information including beam pattern information for a plurality of reference signals associated with at least two sub-bands, receiving reference signal measurement information from the mobile device, and determining the location of the mobile device based at least in part on the array gain information and the reference signal measurement information.

Implementations of such a method may include one or more of the following features. The at least two sub-bands may be based on bandwidth parts utilized by the mobile device. The at least two sub-bands may be two different resource bandwidths within an active bandwidth part utilized by the mobile device. The at least two sub-bands may be two sets of resource blocks utilized by the plurality of reference signals. The at least two sub-bands may be at least two component carriers for the plurality of reference signals. The plurality of reference signals may be downlink positioning reference signals. The array gain information may include gain and direction information of at least one of a main lobe, side lobes, beam nulls, and grating lobes of each of the plurality of reference signals.

An example method for providing frequency dependent beam pattern assistance data to a mobile device according to the disclosure includes providing assistance data to one or more mobile devices, the assistance data including beam pattern information for a plurality of reference signals associated with at least two sub-bands, and transmitting one or more reference signals in the at least two sub-bands, wherein an angle of departure for each of the one or more reference signals is based at least in part on a sub-band the one or more reference signals are being transmitted in.

An example method for network assisted positioning according to the disclosure includes providing array gain information to a network server, the array gain information including beam pattern information for a plurality of reference signals associated with at least two sub-bands, and transmitting one or more reference signals in a sub-band to one or more mobile devices, wherein an angle of departure for each of the one or more reference signals is based at least in part on the sub-band.

An example apparatus according to the disclosure includes a memory, at least one transceiver, at least one processor communicatively coupled to the memory and the at least one transceiver and configured to receive, with the at least one transceiver, positioning assistance data including beam pattern information for a plurality of reference signals associated with at least two sub-bands, receive, with the at least one transceiver, at least one of the plurality of reference signals within a sub-band, and determine an angle of departure value for at least one of the plurality of reference signals based at least in part on the positioning assistance data for the sub-band.

Implementations of such an apparatus may include one or more of the following features. The at least one processor may be further configured to determine a location based at least in part on the angle of departure value. The sub-band may be an active bandwidth part utilized by the apparatus. The sub-band may be a resource bandwidth within an active bandwidth part utilized by the apparatus. The sub-band may be a set of resource blocks received by the apparatus. The sub-band may be a component carrier of the plurality of reference signals. The plurality of reference signals may be downlink positioning reference signals. The positioning assistance data may include gain and direction information of at least one of a main lobe, side lobes, beam nulls, and grating lobes of each of the plurality of reference signals. The at least one processor may be further configured to receive a second reference signal in a second sub-band and determine an angle of departure for the second reference signal based at least in part on a frequency associated with the second sub-band.

An example apparatus according to the disclosure includes a memory, at least one transceiver, at least one processor communicatively coupled to the memory and the at least one transceiver and configured to receive, with the at least one transceiver, array gain information from a base station, the array gain information including beam pattern information for a plurality of reference signals associated with at least two sub-bands, receive, with the at least one transceiver, reference signal measurement information from a mobile device, and determine a location of the mobile device based at least in part on the array gain information and the reference signal measurement information.

Implementations of such an apparatus may include one or more of the following features. The at least two sub-bands may be based on bandwidth parts utilized by the mobile device. The at least two sub-bands may be two different resource bandwidths within an active bandwidth part utilized by the mobile device. The at least two sub-bands may be two sets of resource blocks utilized by the plurality of reference signals. The at least two sub-bands may be at least two component carriers for the plurality of reference signals. The plurality of reference signals may be downlink positioning reference signals. The array gain information may include gain and direction information of at least one of a main lobe, side lobes, beam nulls, and grating lobes of each of the plurality of reference signals.

An example apparatus according to the disclosure includes a memory, at least one transceiver, at least one processor communicatively coupled to the memory and the at least one transceiver and configured to provide assistance data to one or more mobile devices, the assistance data including beam pattern information for a plurality of reference signals associated with at least two sub-bands, and transmit, with the at least one transceiver, one or more reference signals in the at least two sub-bands, wherein an angle of departure for each of the one or more reference signals is based at least in part on a sub-band the one or more reference signals are being transmitted in.

An example apparatus according to the disclosure includes a memory, at least one transceiver, at least one processor communicatively coupled to the memory and the, at least one transceiver and configured to provide array gain information to a network server, the array gain information including beam pattern information for a plurality of reference signals associated with at least two sub-bands, and transmit, with the at least one transceiver, one or more reference signals in a sub-band to one or more mobile devices, wherein an angle of departure for each of the one or more reference signals is based at least in part on the sub-band.

An example apparatus for determining positioning information with a mobile device according to the disclosure includes means for receiving positioning assistance data including beam pattern information for a plurality of reference signals associated with at least two sub-bands, means for receiving at least one of the plurality of reference signals within a sub-band, and means for determining an angle of departure value for at least one of the plurality of reference signals based at least in part on the positioning assistance data for the sub-band.

An example apparatus for determining a location of a mobile device according to the disclosure includes means for receiving array gain information from a base station, the array gain information including beam pattern information for a plurality of reference signals associated with at least two sub-bands, means for receiving reference signal measurement information from the mobile device, and means for determining the location of the mobile device based at least in part on the array gain information and the reference signal measurement information.

An example apparatus for providing frequency dependent beam pattern assistance data to a mobile device according to the disclosure includes means for providing assistance data to one or more mobile devices, the assistance data including beam pattern information for a plurality of reference signals associated with at least two sub-bands, and means for transmitting one or more reference signals in the at least two sub-bands, wherein an angle of departure for each of the one or more reference signals is based at least in part on a sub-band the one or more reference signals are being transmitted in.

An example apparatus for network assisted positioning according to the disclosure includes means for providing array gain information to a network server, the array gain information including beam pattern information for a plurality of reference signals associated with at least two sub-bands, and means for transmitting one or more reference signals in a sub-band to one or more mobile devices, wherein an angle of departure for each of the one or more reference signals is based at least in part on the sub-band.

An example non-transitory processor-readable storage medium comprising processor-readable instructions configured to cause one or more processors to determine positioning information with a mobile device according to the disclosure includes code for receiving positioning assistance data including beam pattern information for a plurality of reference signals associated with at least two sub-bands, code for receiving at least one of the plurality of reference signals within a sub-band, and code for determining an angle of departure value for at least one of the plurality of reference signals based at least in part on the positioning assistance data for the sub-band.

An example non-transitory processor-readable storage medium comprising processor-readable instructions configured to cause one or more processors to determine a location of a mobile device according to the disclosure includes code for receiving array gain information from a base station, the array gain information including beam pattern information for a plurality of reference signals associated with at least two sub-bands, code for receiving reference signal measurement information from the mobile device, and code for determining the location of the mobile device based at least in part on the array gain information and the reference signal measurement information.

An example non-transitory processor-readable storage medium comprising processor-readable instructions configured to cause one or more processors to provide frequency dependent beam pattern assistance data to a mobile device according to the disclosure includes code for providing assistance data to one or more mobile devices, the assistance data including beam pattern information for a plurality of reference signals associated with at least two sub-bands, and code for transmitting one or more reference signals in the at least two sub-bands, wherein an angle of departure for each of the one or more reference signals is based at least in part on a sub-band the one or more reference signals are being transmitted in.

An example non-transitory processor-readable storage medium comprising processor-readable instructions configured to cause one or more processors to provide network assisted positioning according to the disclosure includes code for providing array gain information to a network server, the array gain information including beam pattern information for a plurality of reference signals associated with at least two sub-bands, and code for transmitting one or more reference signals in a sub-band to one or more mobile devices, wherein an angle of departure for each of the one or more reference signals is based at least in part on the sub-band.

Items and/or techniques described herein may provide one or more of the following capabilities, as well as other capabilities not mentioned. A base station may utilize an antenna array with a fixed element spacing. The fixed element spacing may cause beam squinting for some frequencies in a wide bandwidth. A wide bandwidth may be defined by a plurality of sub-bands. Beam parameters such as beam patterns or beam shapes may be defined for each of the sub-bands. The sub-bands may be bandwidth parts, bandwidth resources, resource blocks, or other frequency domain objects. Assistance data may be provided to mobile devices and network resources to associate the sub-bands with the respective beam parameters. The accuracy of angle of departure and angle of arrival based positioning may be improved. Other capabilities may be provided and not every implementation according to the disclosure must provide any, let alone all, of the capabilities discussed.

DETAILED DESCRIPTION

Figure 1:
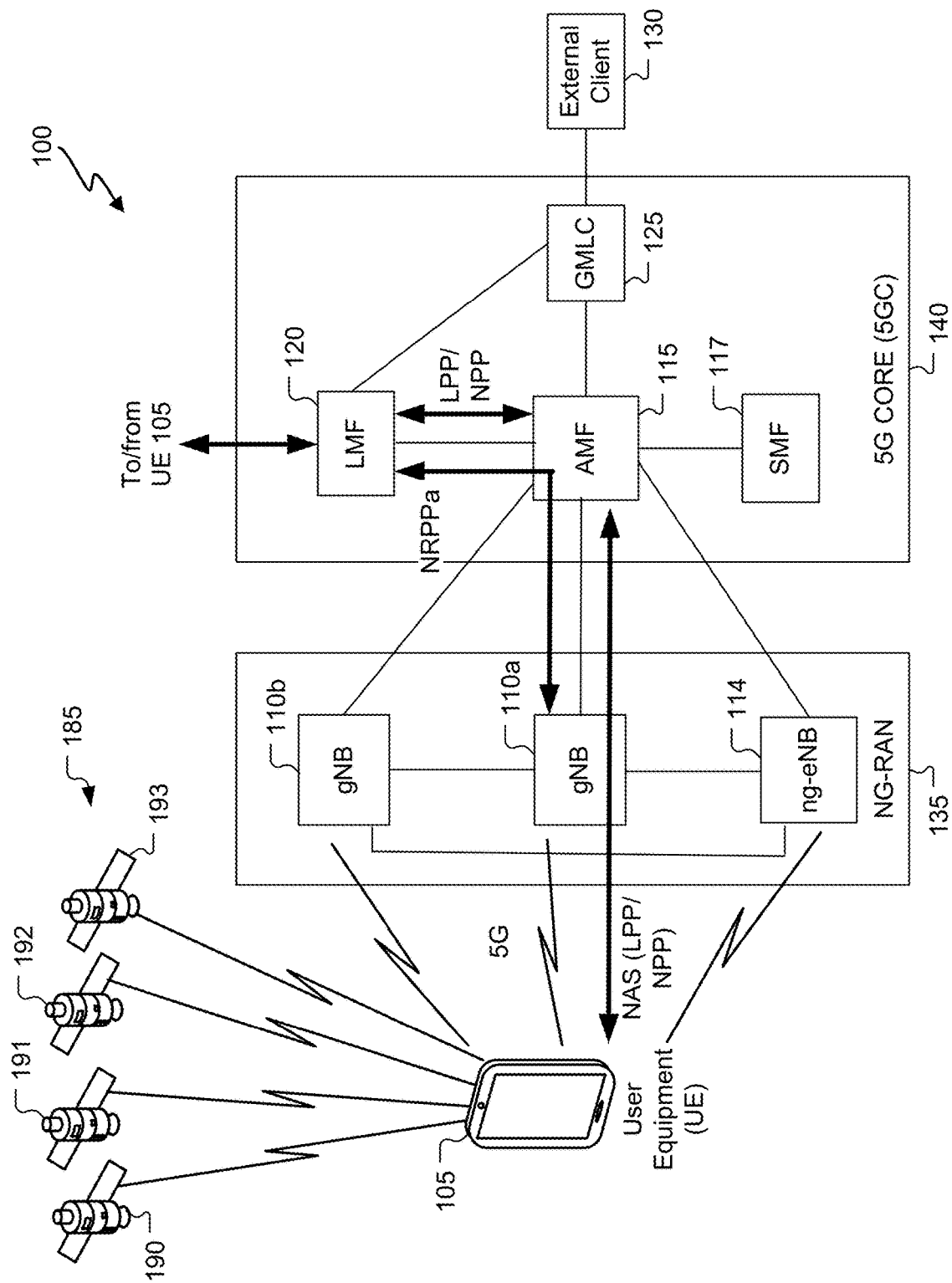
FIG. 1 is a simplified diagram of an example wireless communications system.

Techniques are discussed herein for enabling user equipment (UE) positioning based on base station side angle estimation in millimeter wave (mmW) bands (and beyond). For example, the techniques include determining and providing beam pattern assistance data as a function of frequency. In a UE-based downlink Angle of Departure (AoD) example, assistance data including information of the beam shapes associated with different sub-bands may be provided to a UE, and the UE may be configured to determine a location based in part on the current sub-band and the beam shape information. In a UE-assisted AoD example, the UE may report measured reference beams on a sub-band to a network resource to determine the location of the UE. In an uplink Angle of Arrival (AoA) approach, the base station may provide an AoA value associated with the dominant cluster in the channel on an uplink (UL) transmission from a UE to a network resource to determine the location of the UE. The AoA value may be based on the beam shapes associated with the sub-band in which the UL transmission was received. These techniques and configurations are examples, and other techniques and configurations may be used.

In operation, a mmW application may require ultra-wideband coverage with an antenna array with a fixed element spacing. For example, the ratio of the element spacing in the antenna array may vary from approximately one-half a wavelength corresponding to the carrier frequency to approximately one wavelength of the carrier frequency. In general, the antenna array gain distribution as a function of spatial angles (e.g., beam pattern/shape) generally drifts with frequency due to beam squinting effects associated with the fixed inter-element spacings for the ultra-wideband coverage. Positioning techniques using a fixed set of beam weights at a certain carrier frequency may generally correspond to certain AoD and AoA estimates at that frequency. The same beam weights, however may correspond to a different AoD and AoA estimates at different frequencies within the ultra-wideband coverage. Thus, the positioning of a UE based on AoD and AoA estimates may be based on the beam shapes associated with the different sub-bands/Resource Block (RB) subsets of configured positioning reference signals (PRSs). For example, a PRS may utilize a wide bandwidth, but a UE may be configured to measure only a subset of the RBs (e.g., the RBs falling within the UE's active Bandwidth Part (BWP), where the active BWP may be changed dynamically).

In an embodiment, a UE, or other network resource, may receive assistance data indicating sub-bands and corresponding beam shapes used by a base station. Different BWPs may have different beam shapes. Different PRS configurations may have different beam shapes. The frequency dependent beam shapes may be used in positioning based on AoD techniques. In another embodiment, a base station, or other network resource, may utilize the frequency dependent beam shapes for AoA based positioning techniques to determine a location of a UE based on UL signals transmitted by the UE and received by one or more base stations. The different beam shapes may be used for azimuth and/or elevation.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes 5G-NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indicator (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Difference Of Arrival (TDOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
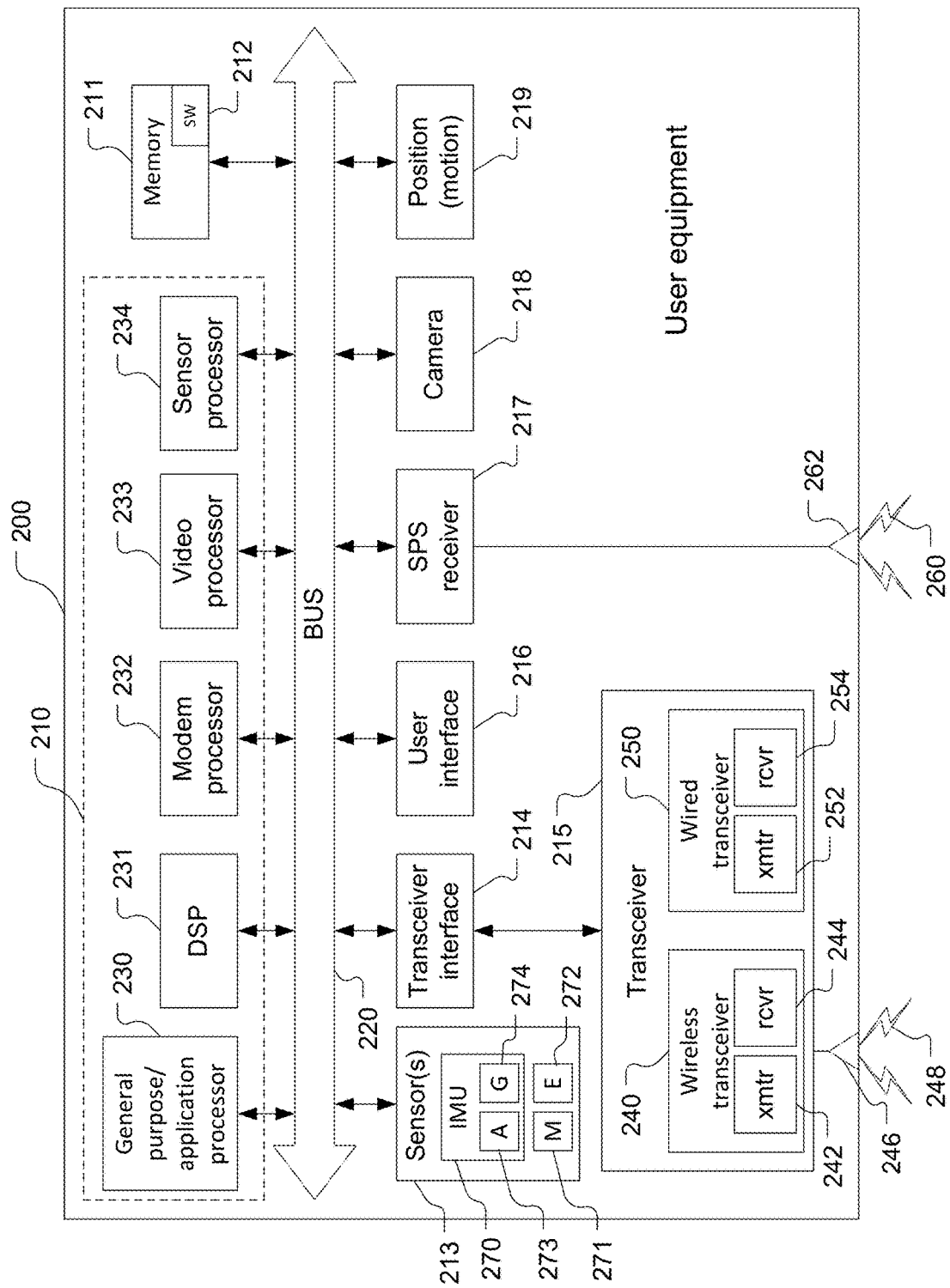
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the network 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
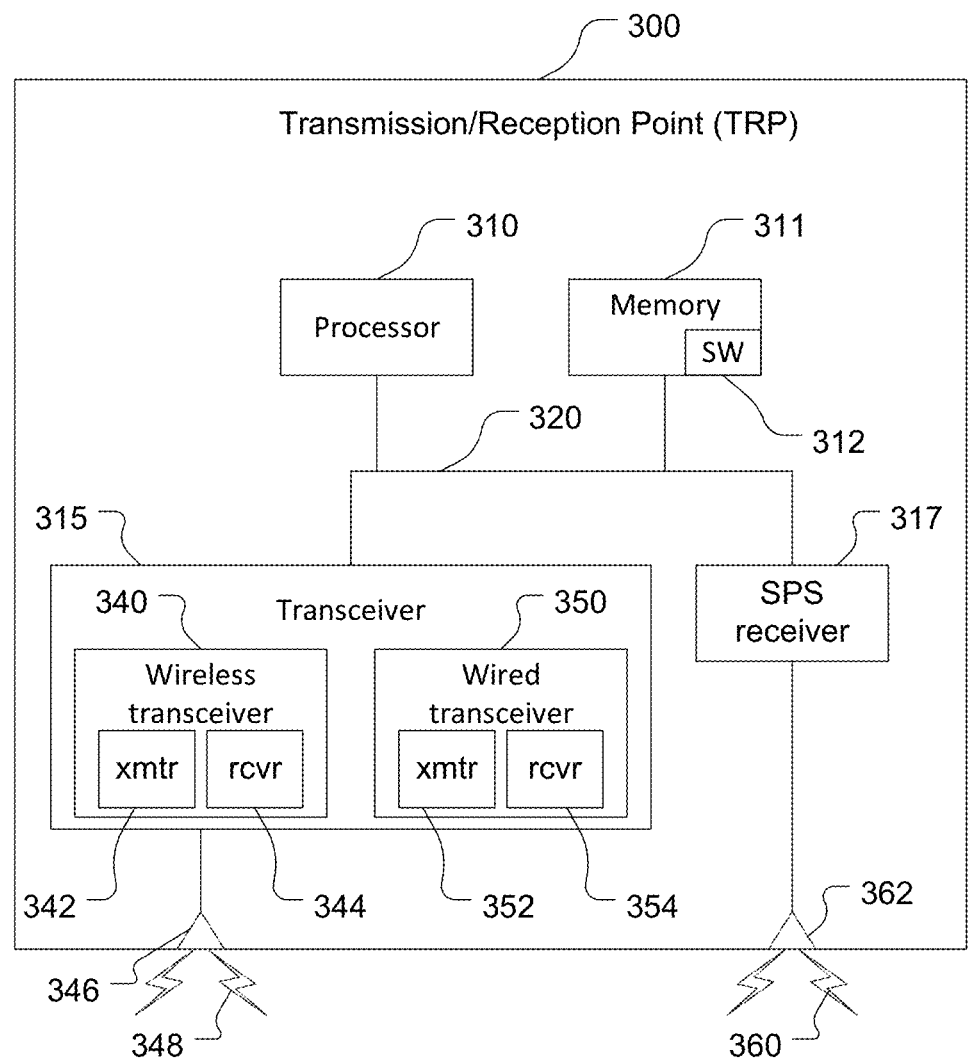
FIG. 3 is a block diagram of components of an example transmission/reception point shown in FIG. 1.
Figure 4:
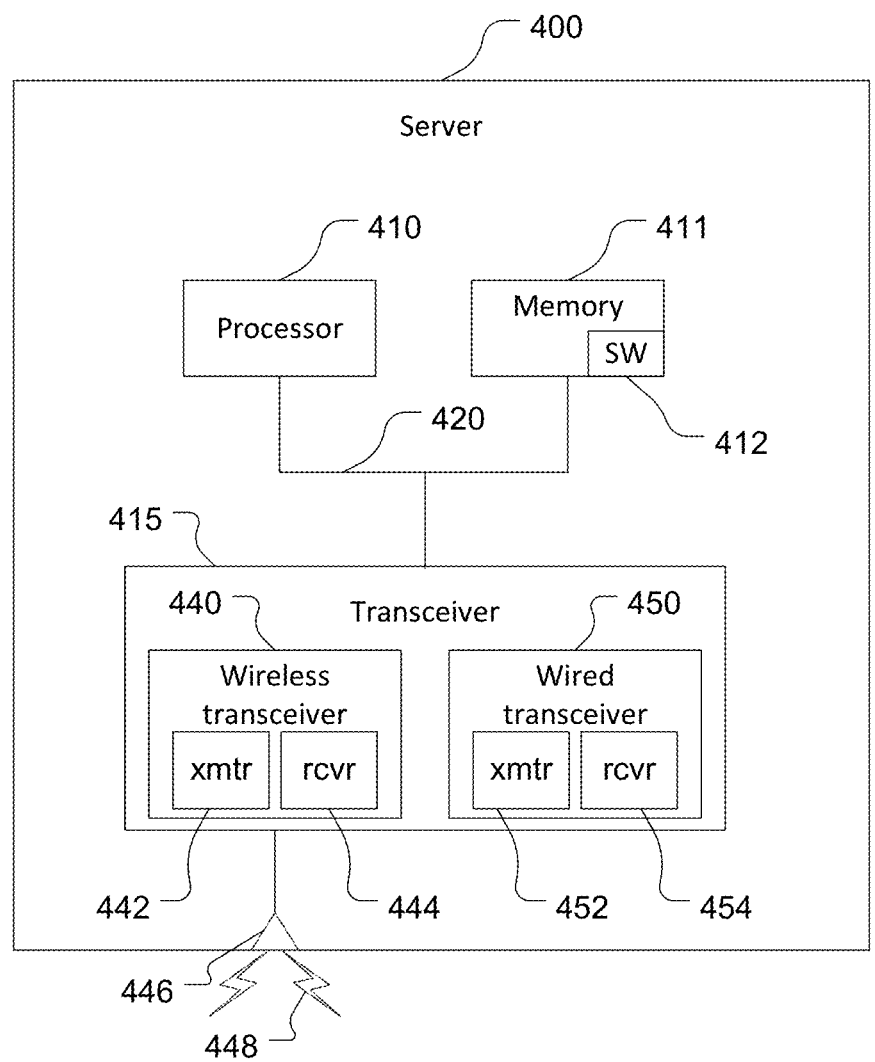
FIG. 4 is a block diagram of components of an example server shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 4). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 4). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the invention, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figures 5A, 5B:
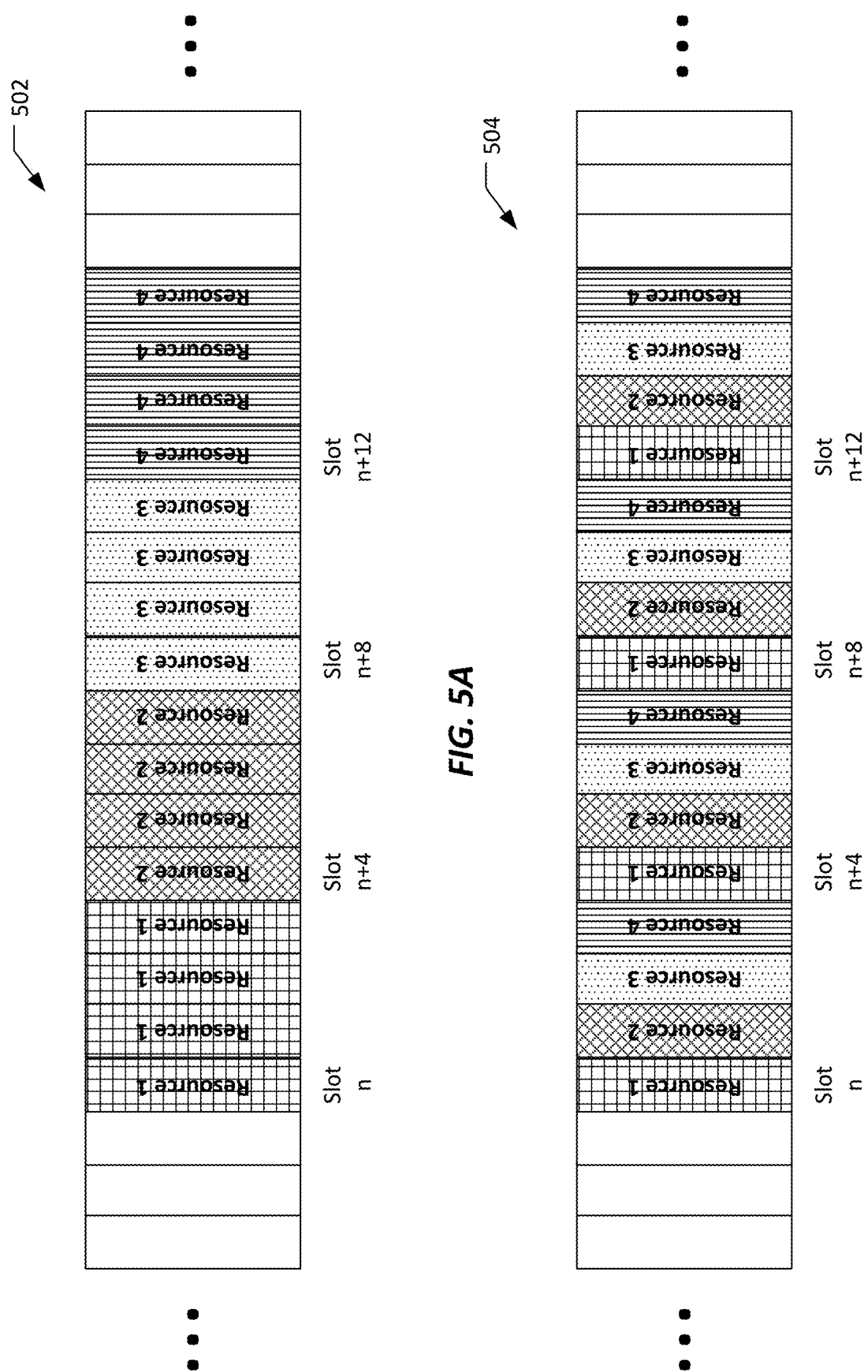
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
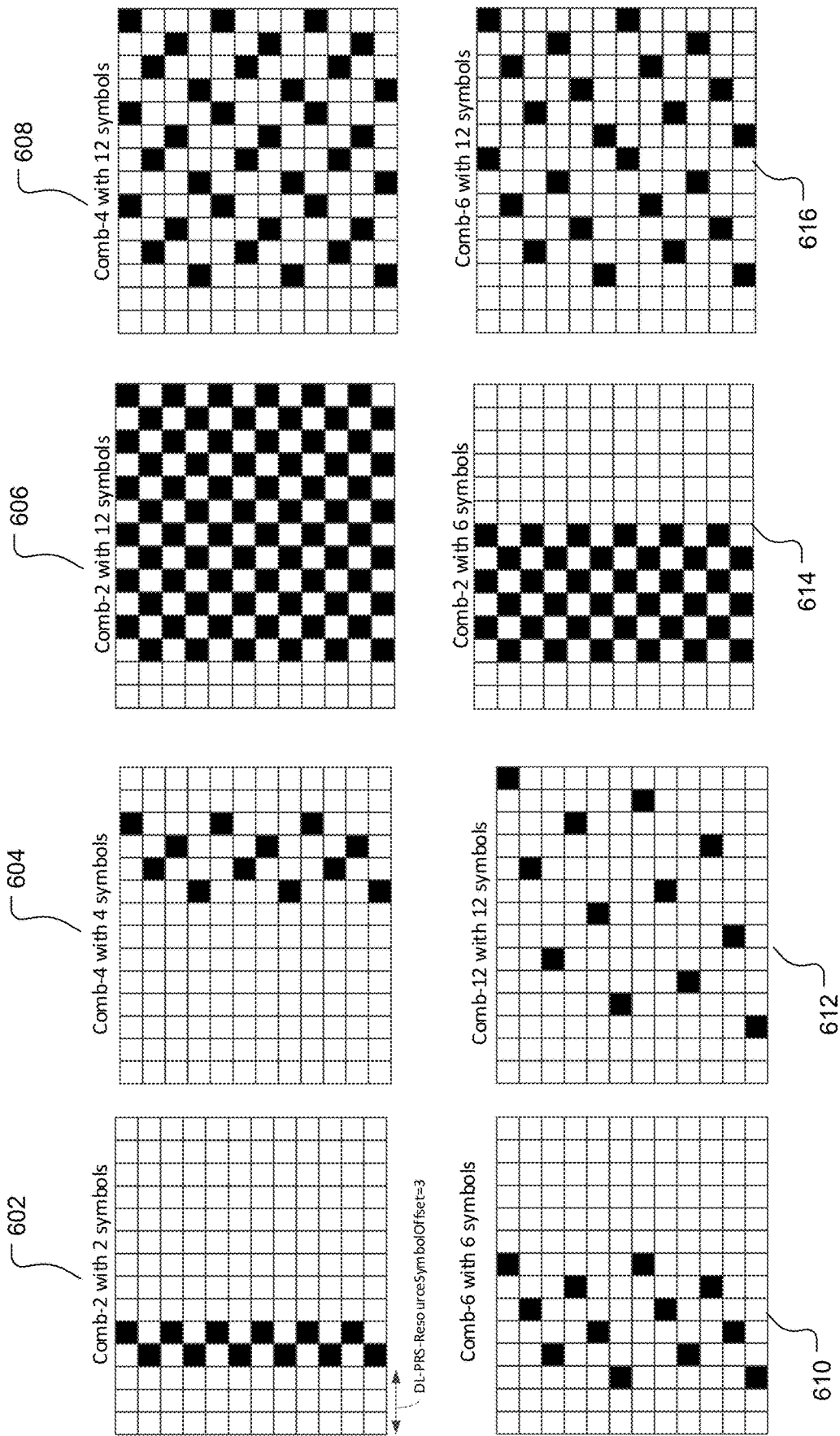
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
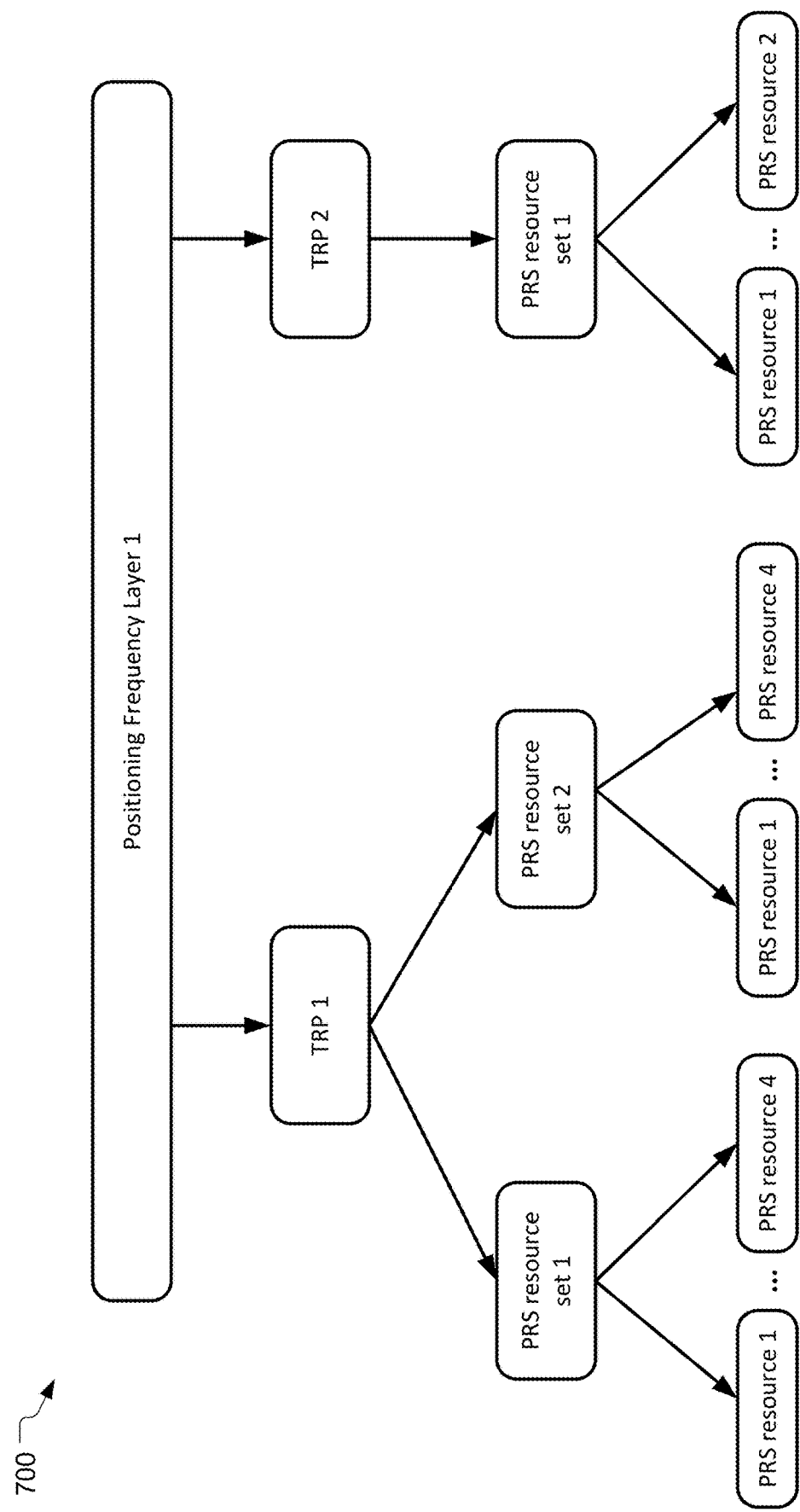
FIG. 7 is a conceptual diagram of an example positioning frequency layer.

Referring to FIG. 7, a conceptual diagram of an example positioning frequency layer 700 is shown. In an example, the positioning frequency layer 700 may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the positioning frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, existing industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Industry standards for higher frequencies (e.g., millimeter wave (mmW)), such as FR4 (i.e., 52.6 GHz-114.25 GHz) may utilize different DL PRS resources and bandwidth parts to provide DL PRS to a UE. The antenna arrays and increased bandwidths utilized in mmW applications may impact the transmit and receive beam patterns associated with different bandwidth parts.

Figure 8:
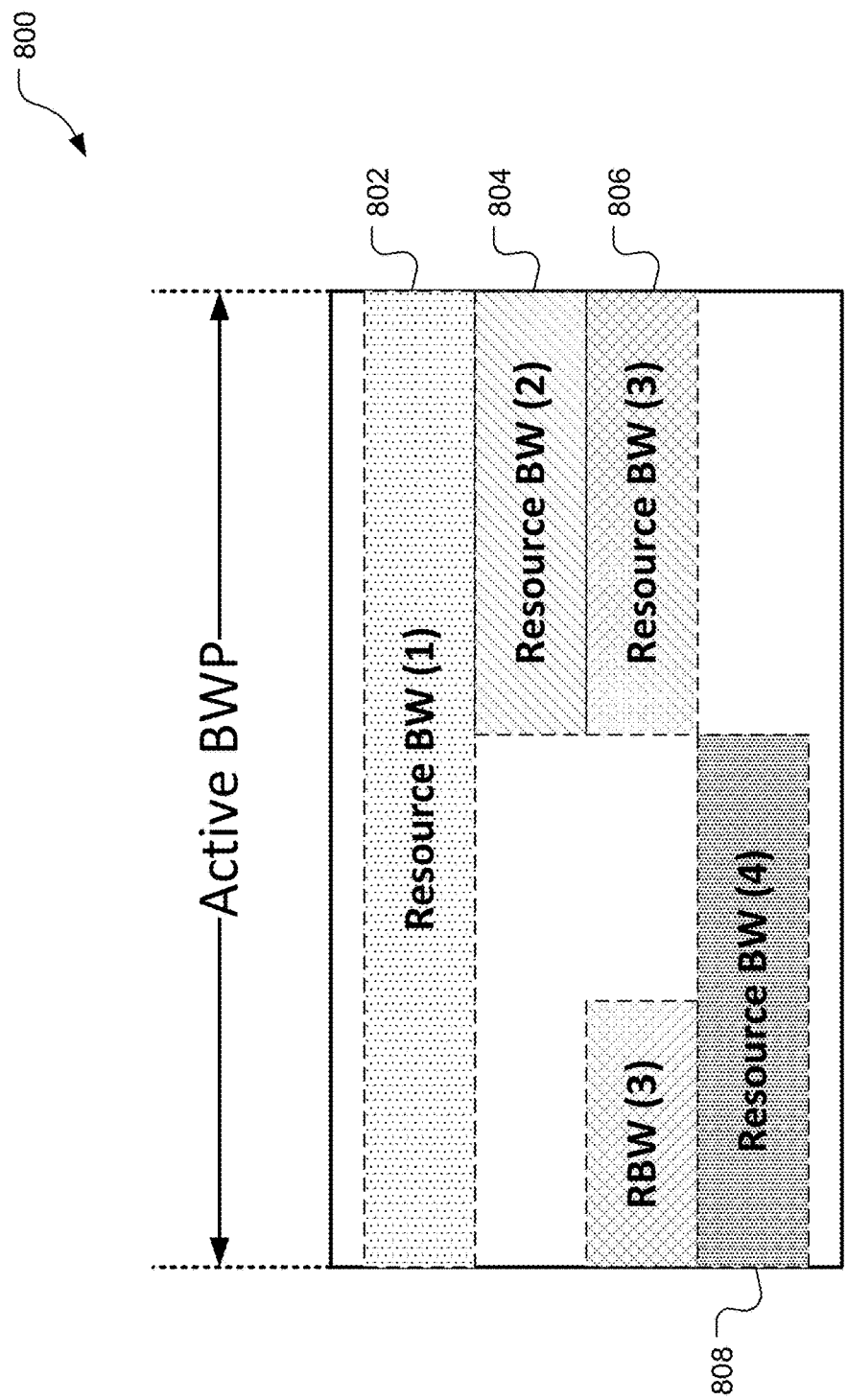
FIG. 8 is a conceptual diagram of an example active bandwidth part with multiple bandwidth resources.

Referring to FIG. 8, an example bandwidth part 800 with a plurality of resource bandwidths is shown. In an embodiment, the beam pattern/shapes of signals transmitted from a station may be associated with a bandwidth part and a resource bandwidth. In general, the bandwidth part (BWP) 800 represents a set of contiguous common resource blocks in the component carrier. In this illustration, the frequency of the BWP 800 is shown along the horizontal axis of FIG. 8. A BWP may be used to provide services to a UE which does not support the full channel bandwidth (i.e., when the channel bandwidths of a base station and a UE do not match). In an example, a UE may be configured with up to 4 DL BWPs per carrier and up to 4 UL BWPs per carrier. The UE may utilize DL and UL BWPs to transmit and receive signals such as a data channel, control channel CSI-RS, DL-PRS, UL-PRS (SRS), PUCCH, PUSCH, etc. The bandwidth part information, including one or more BWPs and associated resource BWs (RBWs) may be signaled by one or more System Information Blocks (SIBs) received from a base station. A UE may be configured with a default DL BWP and/or receive a parameter structure to configure an initial DL BWP (e.g., using the initialDownlinkBWP parameter structure defined in 3GPP TS 38.211). The parameters for UL BWPs may be received in the bandwidth part information (e.g., via SIBs or other dedicated signaling). A base station may dynamically switch the activated BWP (e.g., the Active BWP) via a Bandwidth Part Indicator field with a Downlink Control Information (DCI) signal.

The bandwidth part information defining the active BWP (i.e., the bandwidth part 800 that is currently active) may further include resource bandwidth information defining a plurality of resource BWs, such as a first resource BW 802, a second resource BW 804, a third resource BW 806, and a fourth resource BW 808. The terms resource BW, RBW, and sub-band may be used interchangeably herein. In contrast to the delay associated with switching an active BWP, a base station may utilize DCI-based or Medium Access Control Control Elements (MAC-CE) signaling to quickly change between the resource BWs 802, 804, 806, 808. Radio Resource Control (RRC) signaling may be used to configure the resource BWs 802, 804, 806, 808 within the BWP 800. The BWP 800 is associated with radio parameters required for communication with the base station (e.g., PUCCH, PUSCH, PRS, SRS, PDSCH, PDCCH, DMRS, etc.) and when the Active BWP is switched, the UE may have to reconfigure internal radio parameters based on the new BWP. Each of the resource BWs 802, 804, 806, 808 inherits the signaling configuration from the Active BWP and may eliminate the need to retune RF components in some UEs. The resource BWs may cover all or some of the Active BWP. For example, the first resource BW 802 covers a significant portion of the Active BWP, and the second, third and fourth resource BW 804, 806, 808 cover smaller portions of the Active BWP. A resource BW may have disjointed coverage over the Active BWP. For example, the third resource BW 806 include areas on both edges of the Active BWP.

Figure 9:
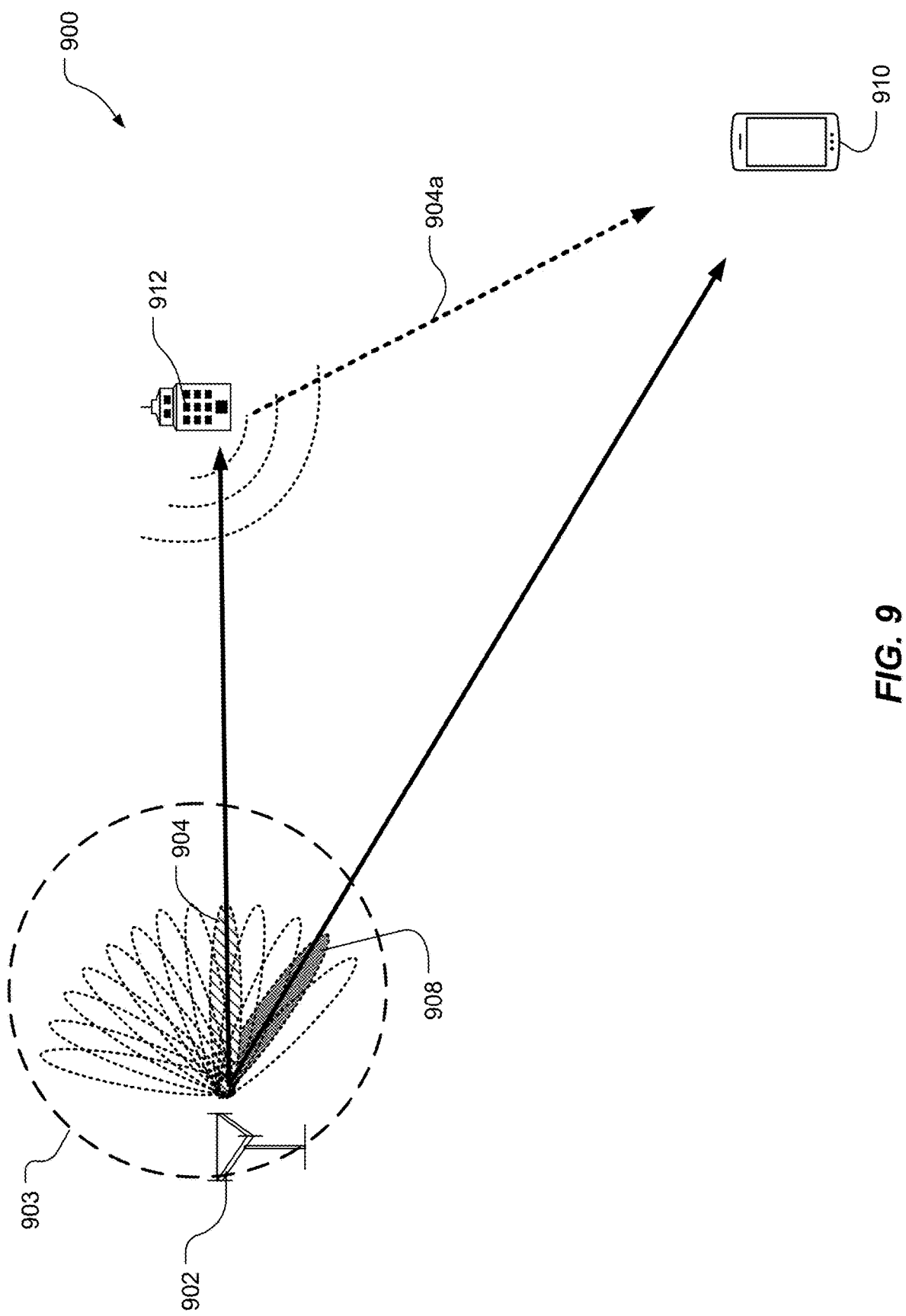
FIG. 9 is a conceptual diagram of beamformed transmissions from a base station.

Referring to FIG. 9, a conceptual diagram 900 of beamformed transmissions from a base station 902 is shown. The base station 902 is an example of a TRP 300 such as the gNBs 110a-b, and the ng-eNB 114, and is configured for transmitting and receiving RF signals utilizing beamforming technologies. A UE 910 is an example of a UE 200 and may be positioned to receive one or more beams transmitted from the base station 902. In an example, the base station 902 may be configured to transmit a first set of beamformed reference signals 903, such as DL-PRSs, in a first sub-band of a frequency layer (e.g., FR4, sub 6G, mmW band, etc.). The beam pattern and beam shapes of the first set of beamformed reference signals 903 transmitted by the base station 902 are based in part on the frequencies of the first sub-band. The first sub-band may be a BWP, RBW, or other distribution of RBs in the frequency layer. The base station 902 is configured to generate the first set of beamformed reference signals 903 based on tuning circuits and phase shifters, and the corresponding codebook parameters associated with each of the beams. For example, a first beam 904 may correspond to a first DL-PRS resource and have a peak in the array gain corresponding to the angle associated with a first reflector 912. The first reflector 912 may be a building or other structure which may cause a non-line of sight (NLOS) path 904a based on a reflection or refraction of the first beam 904. The UE 910 may receive the NLOS path 904a. A second beam 908 may have a peak array gain angle (i.e., AoD) aimed at the UE 910. In operation, the UE 910 may be configured to utilize the AoD of the first and/or second beams 904, 908 in positioning locations. For example, the location of the base station 902 and the reflector 912 and the corresponding beam coverage areas associated with the AoDs may be known. Other measurements from the first and second beams 904, 908, as well as beams from other base stations (not shown in FIG. 9) may also be used to determine a location based on multilateration and other ranging techniques (e.g., TDOA, RTT, RSSI, RSRP, etc.). The accuracy of the AoD of the beams transmitted by the base station 902 may impact the accuracy of the position estimates for the UE 910 and thus changes in the beam shapes of the first and second beams 904, 908 due to beam squinting may also impact the position estimates.

Figure 10A:
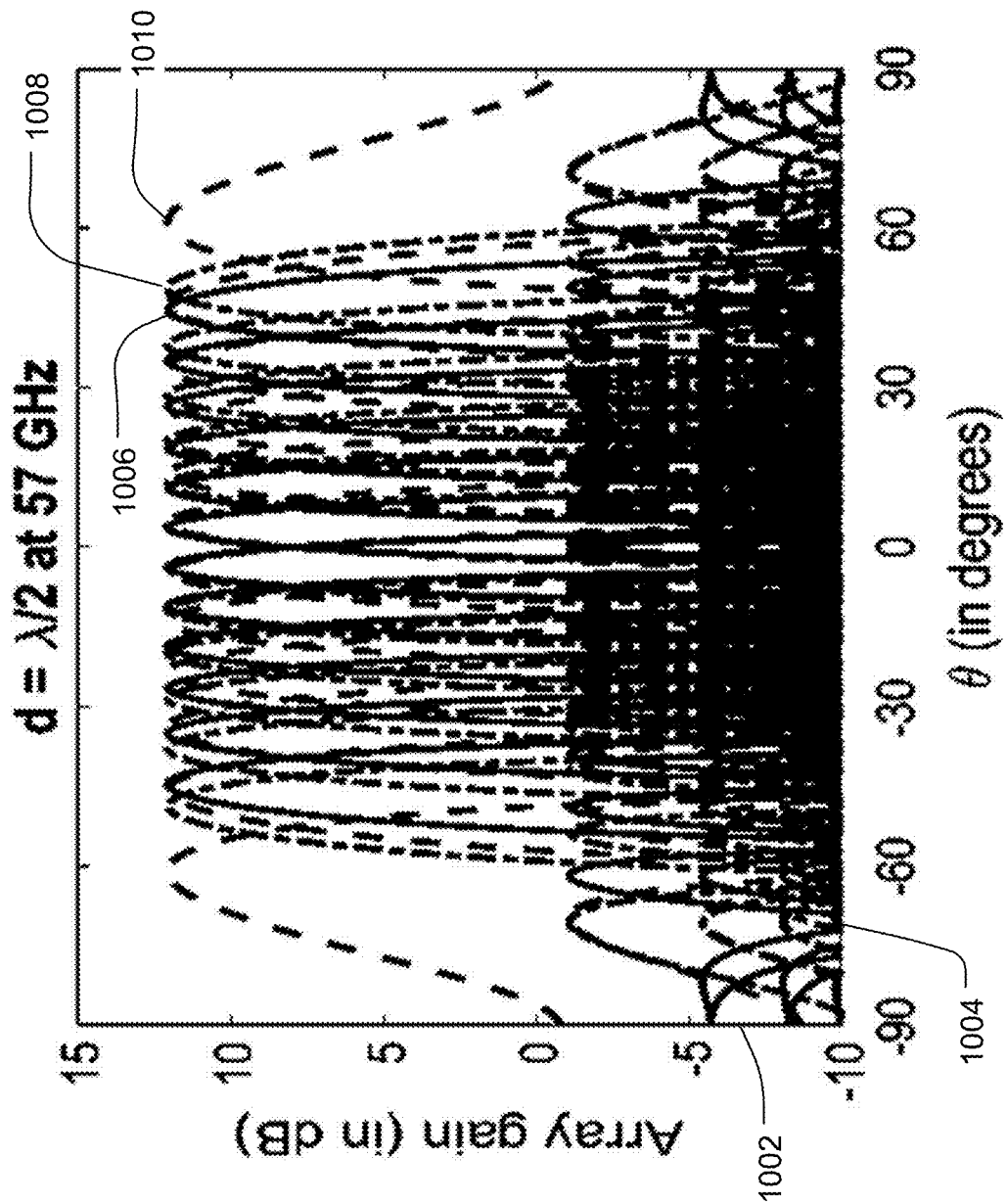
FIGS. 10A and 10B are graphical examples of beam squinting associated with antenna codebook designs.
Figure 10B:
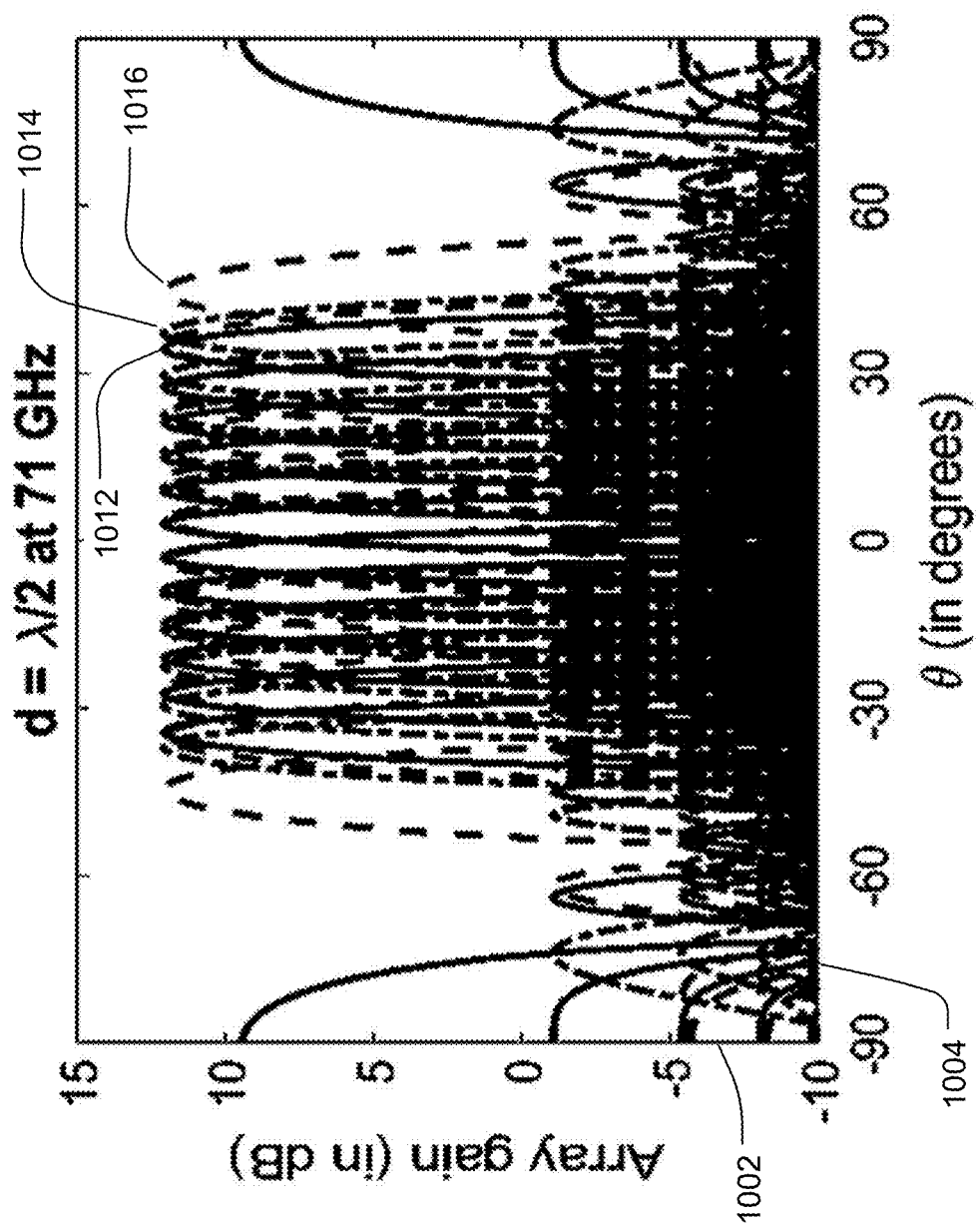

Referring to FIGS. 10A and 10B, graphical examples of beam squinting associated with antenna codebook designs are shown. The graphs in FIGS. 10A and 10B include an array gain axis 1002 and a spatial angle axis 1004, and represent beams generated by two example 16×1 arrays with element spacing equal to half a wavelength (i.e., d=λ/2) for 57 GHz (FIG. 10A) and 71 GHz (FIG. 10B). The antenna arrays are configured to cover +/−50 degrees around a boresight direction with a size-12 codebook. That is, each of the 12 beams in the 57 GHz array in FIG. 10A are based on the associated codebook parameters for that beam, and each of the 12 beams in the 71 GHz array in FIG. 10B are based on the associated codebook parameters for that beam. Each graph includes the gain and spatial angle values for three different frequencies: 57 GHz, 61 GHz, and 71 GHz. The different frequency values are examples of different sub-bands that may utilize an antenna array, and when the frequencies in the sub-bands are not the same as the preferred element spacing. That is, the wavelengths (λ) of the signals in the sub-band may be different than the d=λ/2 of the array spacing. Since the codebooks for the arrays are the same regardless of the frequency of the input signal (with codebook loading time dependent on the RF settling time which can be considerably high at mmWave carrier frequencies), the resulting angles at which peaks in array gains are seen can vary based on the different input signals. This effect is referred to as beam squinting. For example, referring to FIG. 10A where the array spacing is configured for d=λ/2 at 57 GHz, the peak angles for array gain with a 57 GHz signal 1006, are different than the peak angles for array gain with a 61 GHz signal 1008, which are different from the peak angles for array gain with a 71 GHz signal 1010. The impact of beam squinting may have a substantial impact of the beam pattern and shape the further the steering angle of the beam is away from the boresight of the array. For example, the outermost beams may vary approximately 20 degrees across the frequencies. In another example, referring to FIG. 10B where the array spacing is configured for d=λ/2 at 71 GHz, the peak angles for array gain with a 57 GHz signal 1012, are different than the peak angles for array gain with a 61 GHz signal 1014, which are different from the peak angles for array gain with a 71 GHz signal 1016.

The beam pattern plots in FIGS. 10A and 10B illustrate that the beams may not correlate well across different frequencies. A different beam index may provide better results at a different carrier frequency especially towards the edge of antenna coverage where the differences in angles may be more significant across different frequencies. For example, depending on the steering angle of interest, beams from either 57 GHz or 71 GHz may provide improved signal strengths (e.g., gain differences may be significant ~2-3 dB). In an example, a smaller codebook size may be sufficient at $f_c$=71 GHz to cover the same area as that covered with $f_c$=57 GHz.

Figure 11:
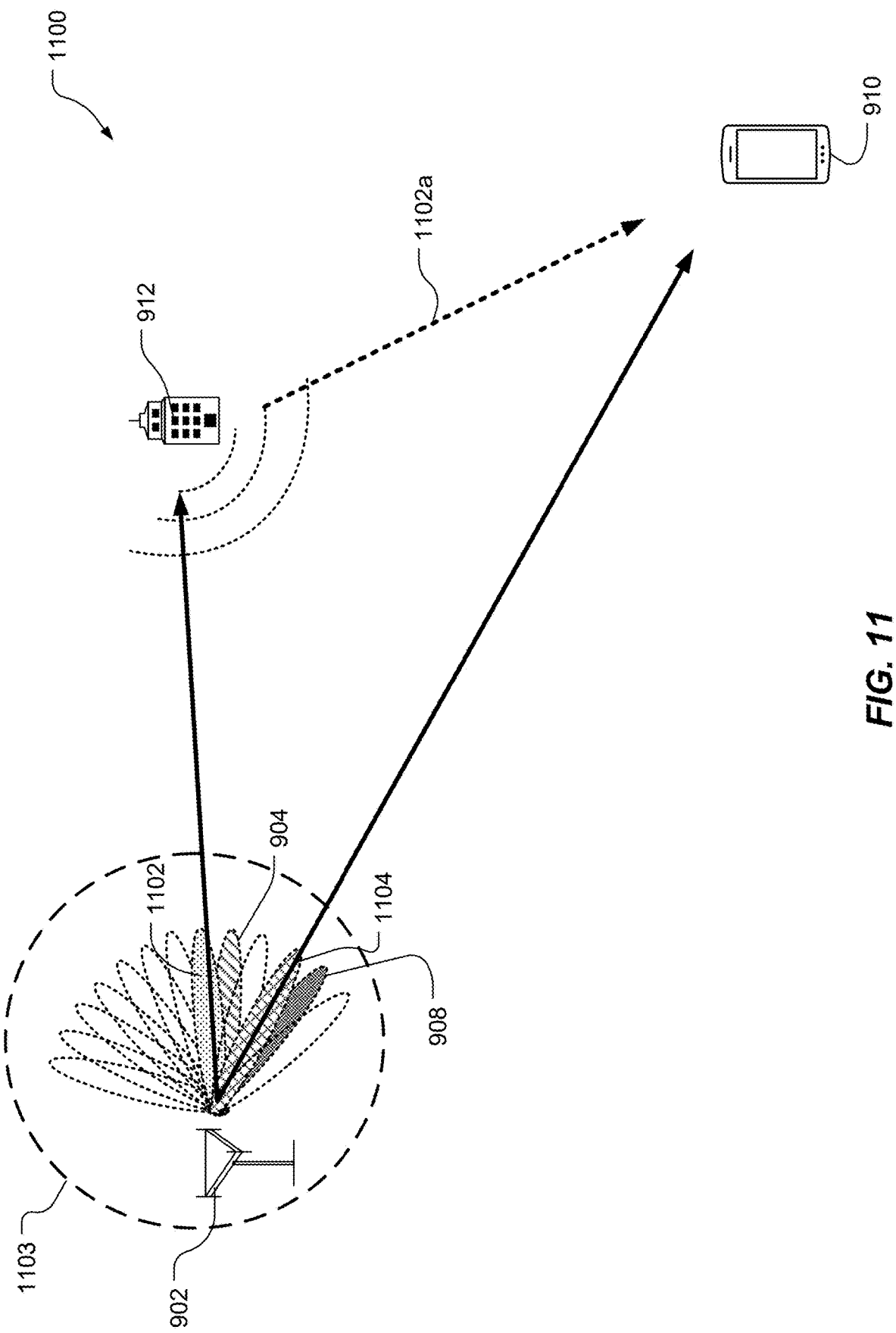
FIG. 11 is a conceptual diagram of an example impact to positioning due to beam squinting.

Referring to FIG. 11, with further reference to FIG. 9, a conceptual diagram 1100 of an example impact to positioning due to beam squinting is shown. In operation, the base station may be configured to generate a second set of beamformed reference signals 1103 based on a second sub-band of the frequency layer. The second sub-band may be a different BWP or another distribution of RBs in the frequency layer as compared to the first sub-band in FIG. 9. Since the base station 902 utilizes the same codebook for the frequency layer, and the first and second sub-bands utilize different frequencies in the frequency layer, the resulting beam squinting may change the beam patterns and beam shapes of the beams in the first and second sub-bands. For example, the beam patterns for the first beam 904 and the second beam 908 may be displaced outward from the boresight of the antenna array such that they are no longer directed towards the reflector 912 and the UE 910. Thus, when the second sub-band is active, the base station 902 may be configured to utilize a third beam 1102 that is directed to the reflector 912 (and generates the NLOS signal 1102a), and a fourth beam 1104 that is directed towards the UE 910. Since the sub-bands may be dynamically activated (e.g., by changing the active BWP), the base station 902 may be configured to alternate between the first and second beams 904, 908 (as depicted in FIG. 9) and the third and fourth beams 1102, 1104 (as depicted in FIG. 10) when the frequencies change between the first and second sub-bands respectively.

Figure 12:
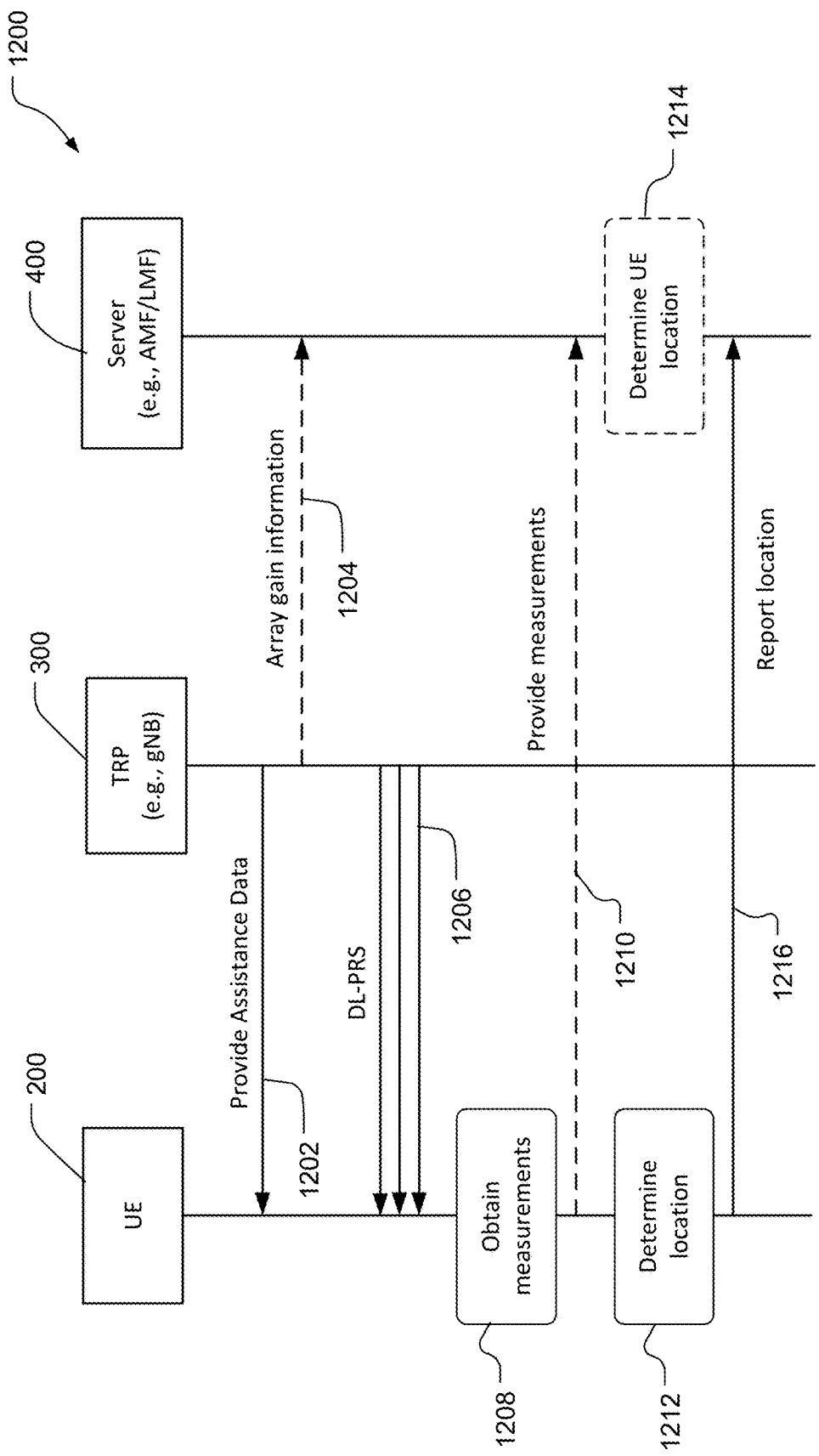
FIG. 12 is an example message flow for providing frequency dependent beam patterns for positioning.

Referring to FIG. 12, an example message flow 1200 for providing frequency dependent beam patterns for positioning is shown. The message flow 1200 is an example only, and not a limitation, as other messages and signaling technologies may be used to propagate the frequency dependent beam patterns. In an embodiment, the message flow 1200 includes a UE 200, a TRP 300, and at least one server 400. In a 5G NR network, such as the communication system 100, the TRP 300 may be a gNB 110*a-b* and the server 400 may be one or more of the AMF 115 and the LMF 120. The TRP 300 may include configuration data associated with antenna gain and beam performance in different sub-bands. The beam angles and shapes may, for example, be associated with a BWP or RBs in DL-PRS configurations. In an example, each of the PRS resources in the positioning frequency layer 700 may be associated with one or more sub-bands and the corresponding beam patterns. The TRP 300 may be configured to provide assistance data including the antenna array gain distribution for two or more sub-bands in one or more provide assistance data messages 1202. The provided assistance data messages 1202 may be provided with unicast or broadcast messages utilizing wireless protocols such as LPP, NRPP, Radio Resource Control (RRC) messaging, or other signaling interfaces. For example, the frequency dependent beam patterns may be included in one or more System Information Blocks (SIBs). The TRP 300 is configured to transmit one or more reference signals 1206 (e.g., DL-PRS) in a sub-band, such that the beams patterns and shapes are associated with the sub-band. At stage 1208, the UE 200 may be configured to obtain measurements of the reference signals 1206 and determine a location at stage 1212 (e.g., local computation). The UE 200 may be configured to report the location results to the network (e.g., the gNB 110*a*, AMF 115, and/or LMF 120) via a Report Location message 1216 (e.g., LPP/NRPPa, RRC, etc.).

In an embodiment, the TRP 300 may provide the frequency dependent beam pattern information to one or more network servers 400 in one or more array gain information messages 1204. The array gain information messages 1204 may be based on existing network protocols such as LPP/NRPPa. In an example, the LMF 120 may be configured to obtain the beam pattern information for multiple sub-bands from multiple TRPs. In a DL-PRS use case, a UE 200 may be configured to provide DL-PRS measurement and sub-band information to the LMF 120 in one or more provided measurement messages 1210, and the LMF 120 may be configured to determine the location of the UE 200 at stage 1214 based on the measurements and the array gain information. In an UL-PRS use case, the TRPs 300 may be configured to provide SRS measurements and sub-band information to the LMF 120, and the LMF 120 may determine the location of the UE 200 based on the SRS measurements and the corresponding array gain information for the sub-band. Other messaging may be used to support positioning utilizing the frequency dependent beam patterns.

Figure 13:
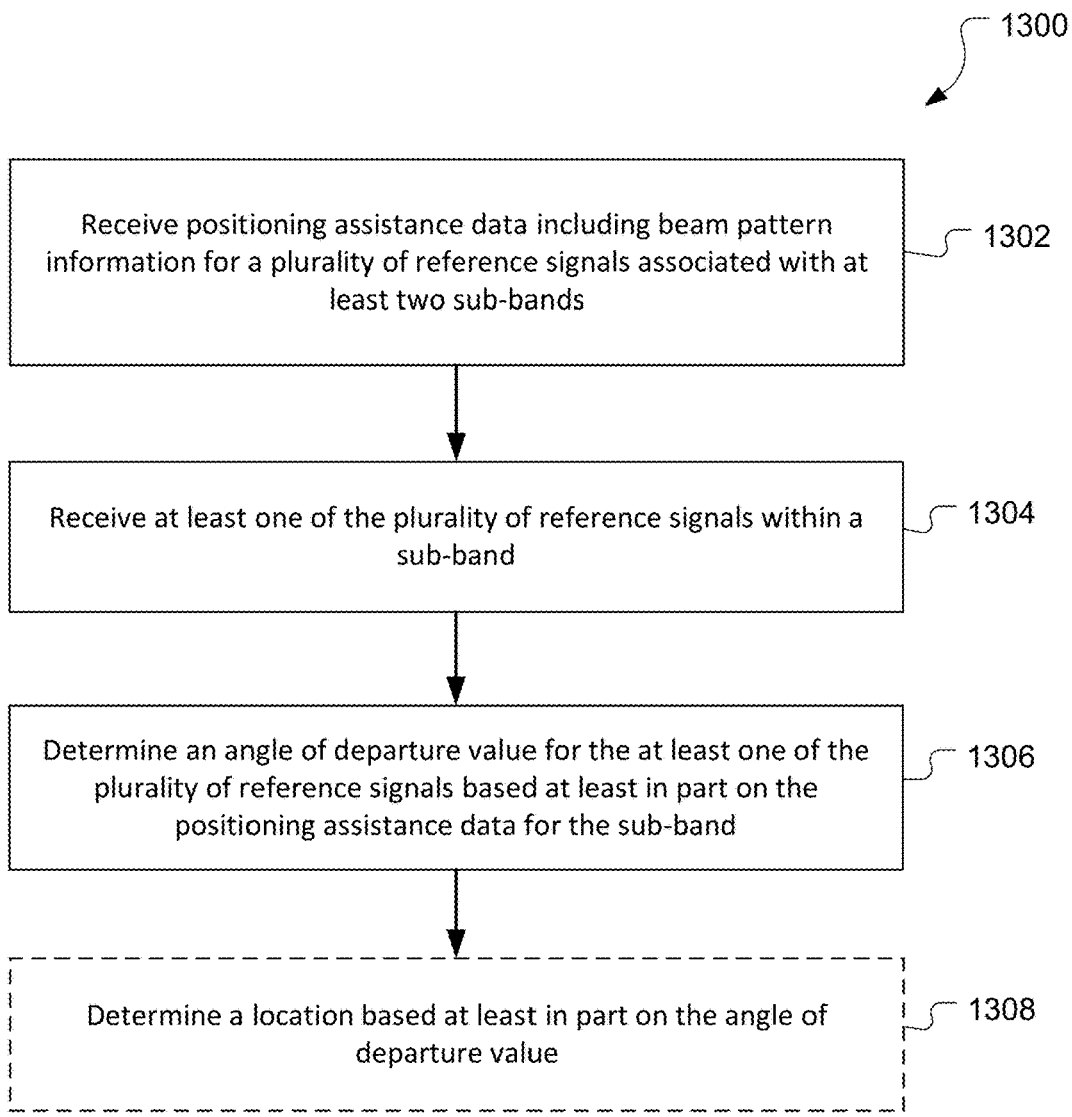
FIG. 13 is a process flow for an example method for determining positioning information with a mobile device.

Referring to FIG. 13, with further reference to FIGS. 1-12, a method 1300 for determining positioning information with a mobile device includes the stages shown. The method 1300 is, however, an example only and not limiting. The method 1300 may be altered, e.g., by having stages added, removed, rearranged, combined, performed concurrently, and/or having single stages split into multiple stages. For example, determining a location at stage 1308 is optional and may be performed by other network resources.

At stage 1302, the method includes receiving assistance data including beam pattern information for a plurality of reference signals associated with at least two sub-bands. The UE 200 is a means for receiving the assistance data. In an example, the assistance data may identify each of the plurality of reference signals by an identification value such as a PRS-ID and indicate beam configuration information for different sub-band values for each of the reference signals. The beam configuration information may include beam pattern information such as bearing and elevation, and other beam pattern and shape information as a function of frequency. For example, referring to FIG. 10A, a first beam may have a steering angle of 45 degrees at 57 GHz and a steering angle of 65 degrees at 71 GHz. The frequency may be based on implicit definition, or associated with other defined sub-bands such as BWPs, RBWs, RBs or other frequency domain objects. The assistance data may include gain and direction information of at least one of the main lobes, side lobes, beam nulls, and grating lobes. In an example, defined reference signals such as a positioning frequency layer may include the frequency dependent beam configuration information. The assistance data may be provided by a network via wireless signaling such as the provided assistance data messages 1202 in the message flow 1200. Other wired and wireless signaling techniques may be used to provide the frequency dependent beam pattern information to the UE 200.

At stage 1304, the method includes receiving at least one of the plurality of reference signals with a sub-band. The UE 200 is a means for receiving the plurality of reference signals. In an example, referring to FIG. 9, a TRP 300 such as the base station 902 is configured to transmit beamformed reference signals 903, such as beamformed DL-PRS signals, across a coverage area. The beamformed reference signals 903 are transmitted in a specific sub-band such as in a configured BWP or other frequency domain objects. The peaks of array gain (e.g., AoD values) of the beamformed reference signals 903 are defined in the assistance data received at stage 1302.

At stage 1306, the method includes determining an angle of departure value for the at least one of the plurality of reference signals based at least in part on the positioning assistance data for the sub-band. The UE 200 is a means for determining the AoD. In an example, the assistance data received at stage 1302 includes a look-up table or other data structure to associate beam identification information and sub-band parameters with AoD values. The AoD may be based on an azimuth and/or an elevation. In a DL-PRS use case, each reference signal includes a PRS-ID value to identify the beam. The UE 200 is operating on designated frequencies (i.e., the sub-band) to receive the reference signal. In an embodiment, the UE 200 is configured to obtain the AoD from a data structure based on the PRS-ID and frequency information. Other beam pattern and shape information may also be included in the data structure (e.g., beamwidth, RSRP values, etc.). In an example, the AoD and other beam factors may be defined as a function of the sub-band and the AoD may be derived as a result of a function rather than a result of a look up table query. Other deterministic techniques may be used to associate a received signal with frequency dependent beam parameters.

At stage 1308, the method optionally includes determining a location based at least in part on the angle of departure value. The UE 200 is a means for determining a location. In an example, the UE 200 may receive DL-PRS signals from a plurality of base stations and may use the AoD and station location information associated with a plurality of signals to determine a location (e.g., based on the intersections of the angles). Other measurement information such as RSSI, RSRP, RTT, TDOA may also be used to determine the location of the UE 200. In an example, the UE 200 may be configured to provide measurement information and/or AoD information to a network resource (e.g., gNB, LMF) configured to determine a location.

In an embodiment, the method 1300 may also utilize UL channels to perform the positioning of the UE 200. For example, the UE 200 may be configured to transmit UL-PRS signals (e.g., SRS) to one or more base stations, and the base stations may determine the Angle of Arrival (AoA) based on the frequency dependent beam patterns. For example, a receive beam for an array on a first frequency may have a different azimuth or elevation than on a second frequency. The AoA and sub-band information associated with a received UL-PRS may be provided to a location server such as the LMF 120 to determine the location of the UE 200.

Figure 14:
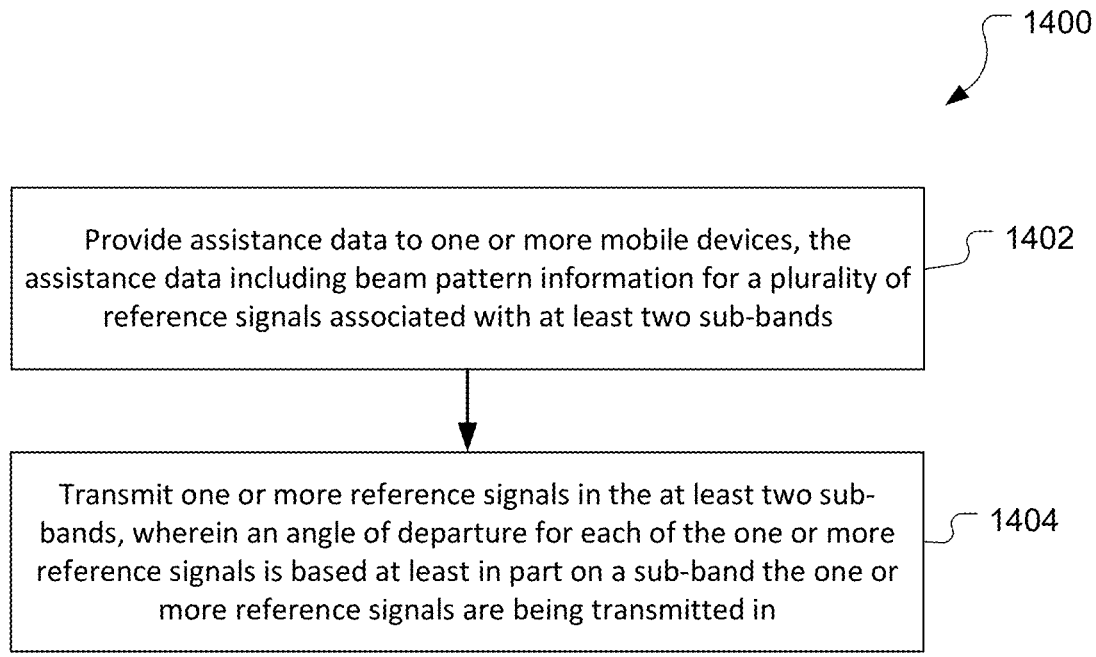
FIG. 14 is a process flow for an example method for providing frequency dependent beam pattern assistance data to a mobile device.

Referring to FIG. 14, with further reference to FIGS. 1-12, a method 1400 for providing frequency dependent beam pattern assistance data to a mobile device includes the stages shown. The method 1400 is, however, an example only and is not limiting. The method 1400 may be altered, e.g., by having stages added, removed, rearranged, combined, performed concurrently, and/or having single stages split into multiple stages.

At stage 1402, the method includes providing assistance data to one or more mobile devices, the assistance data including beam pattern information for a plurality of reference signals associated with at least two sub-bands. The TRP 300 is a means for providing assistance data. In an example, a TRP 300 may include one or more antenna arrays and associated codebooks for enabling transmit and receive beamforming. The codebooks may include the parameters for tuning and phase shifting elements in the receive chain for an operational frequency. The antenna arrays may have a wide operational bandwidth which may be defined by multiple sub-bands (e.g., BWPs, RBWs, RBs, etc.). The different sub-bands may cause beam squinting such as depicted in FIGS. 10A and 10B. The beam parameters, including the beam pattern information, may be characterized for each sub-band. The assistance data may include gain and direction information of at least one of the main lobes, side lobes, beam nulls, and grating lobes. The characterizations may persist as a look up table, or may be defined as a functional relationship, based on the sub-band. The assistance data may include a look-up table or function parameters configured to enable a UE to determine an AoD based at least in part on the sub-bands. In an example, the assistance data may be provided via one or more provide assistance data messages 1202 in the message flow 1200.

At stage 1404, the method includes transmitting one or more reference signals in the at least two sub-bands, wherein an angle of departure of each of the one or more reference signals is based at least in part on a sub-band where the one or more reference signals are being transmitted in. The TRP 300 is a means for transmitting the one or more reference signals. In an example, the TRP 300 is configured to transmit reference signal such as DL-PRS in a plurality of beams. The directions of the beams are based at least in part on the frequency they are being transmitted on (i.e., due to the effects of beam squinting as previously described). Each of the DL-PRS may include beam identification information to enable the receiving station to identify the beam and determine the AoD based on the identification information and the current sub-band (e.g., the active BWP).

Figure 15:
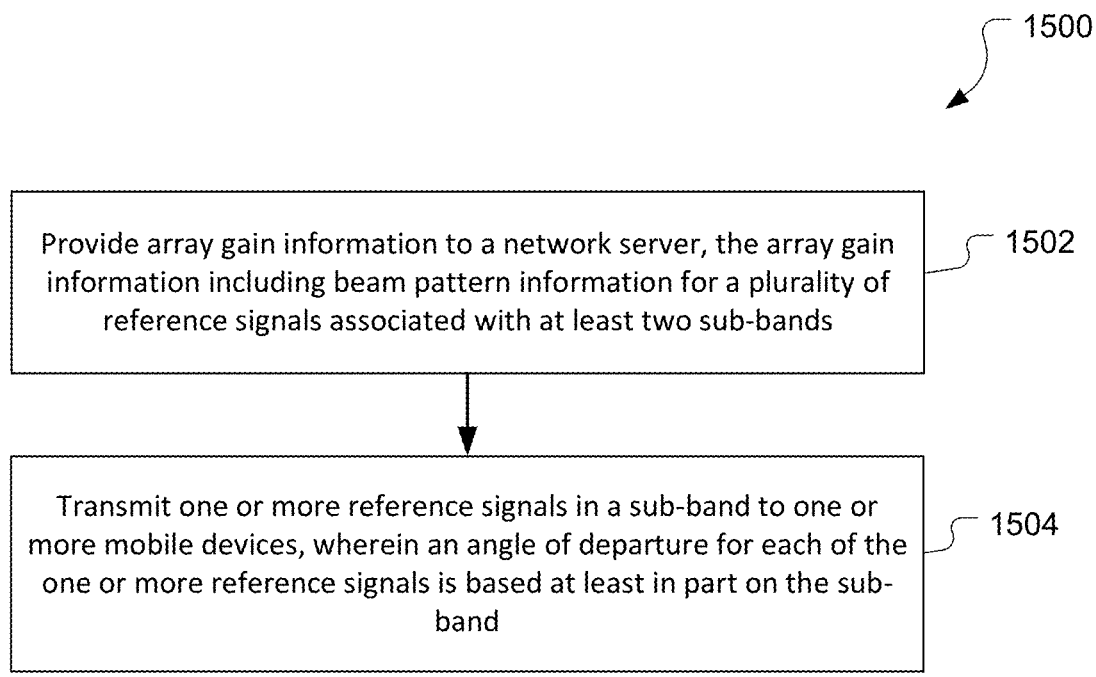
FIG. 15 is a process flow for an example method for network assisted positioning.

Referring to FIG. 15, with further reference to FIGS. 1-12, a method 1500 for network assisted positioning includes the stages shown. The method 1500 is, however, an example only and is not limiting. The method 1500 may be altered, e.g., by having stages added, removed, rearranged, combined, performed concurrently, and/or having single stages split into multiple stages.

At stage 1502, the method includes providing array gain information to a network server, the array gain information including beam pattern information for a plurality of reference signals associated with at least two sub-bands. The TRP 300 is a means for providing the array gain information. In an example, a TRP 300 may include one or more antenna arrays and associated codebooks for enabling transmit and receive beamforming. The codebooks may include the parameters for tuning and phase shifting elements in the receive chain for an operational frequency. The array gain information may include the beam direction and beam shape information such as depicted in FIGS. 10A and 10B. The array gain information, including the beam pattern information, may be characterized for each sub-band. The array gain distribution may include gain and direction information of at least one of the main lobes, side lobes, beam nulls, and grating lobes. The characterization may persist as a look-up table, or may be defined as a functional relationship, based on the sub-band. The array gain information may include look-up tables or other function parameters configured to enable a server such as the LMF 120 to determine AoD and AoA information for DL and UL reference signals based at least in part on the sub-bands. In an example, the array gain information may be provided to a network resource such as the AMF 115 and/or the LMF 120 via one or more of the array gain information messages 1204.

At stage 1504, the method includes transmitting one or more reference signals in a sub-band to one or more mobile devices, wherein an angle of departure of each of the one or more reference signals is based at least in part on a sub-band. The TRP 300 is a means for transmitting the one or more reference signals. In an example, the TRP 300 is configured to transmit reference signals such as DL-PRS in a plurality of beams. The directions of the beams are based at least in part on the frequency they are being transmitted on (i.e., due to the effects of beam squinting). Each of the DL-PRS may include beam identification information to enable the receiving station to identify the beam. In an embodiment, a mobile device may provide the beam identification to a network server (e.g., the LMF 120) to determine the AoD based on the identification information and the sub-band the reference signal was received in.

Figure 16:
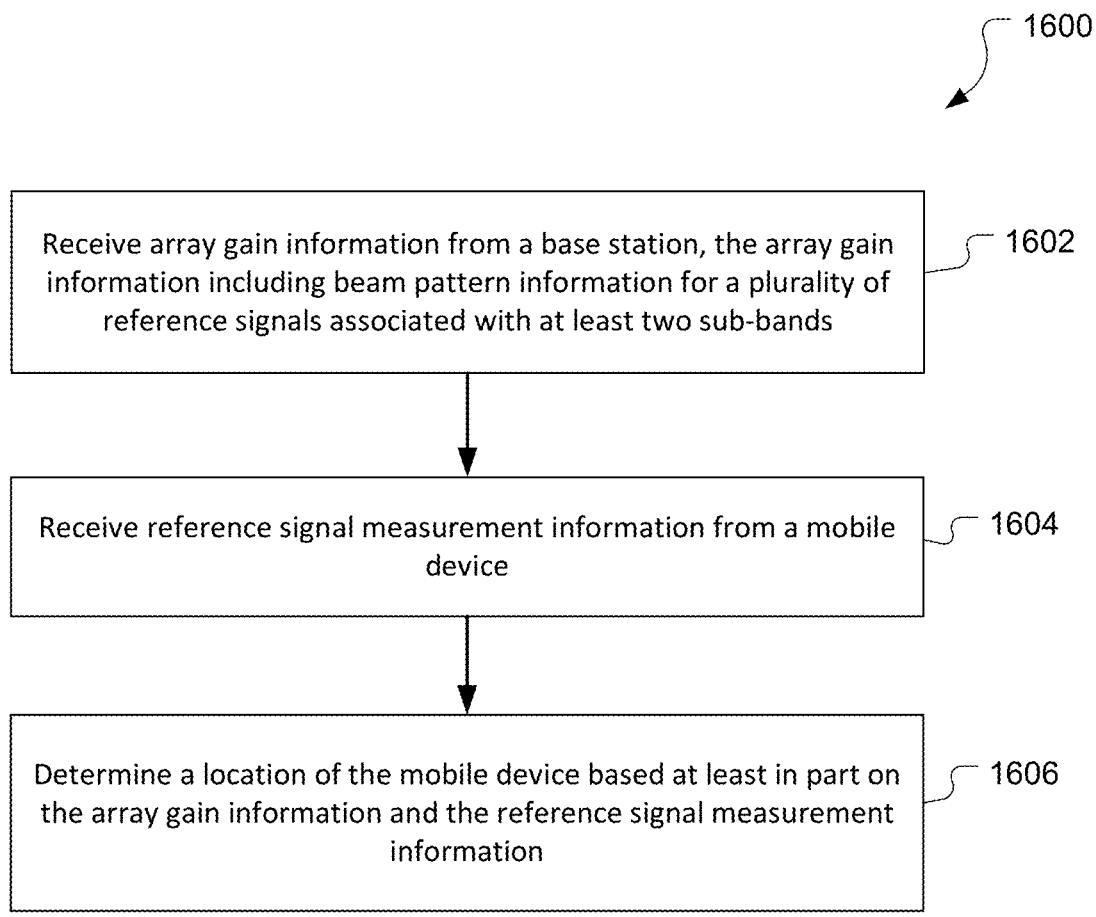
FIG. 16 is a process flow for an example method for determining a location of a mobile device based at least in part on frequency dependent beam patterns.

Referring to FIG. 16, with further reference to FIGS. 1-12, a method 1600 for determining a location of a mobile device based at least in part on frequency dependent beam patterns includes the stages shown. The method 1600 is, however, an example only and not limiting. The method 1600 may be altered, e.g., by having stages added, removed, rearranged, combined, performed concurrently, and/or having single stages split into multiple stages.

At stage 1602, the method includes receiving array gain information from a base station, the array gain information including beam pattern information for a plurality of reference signals associated with at least two sub-bands. A server 400, such as the LMF 120, is a means for receiving the array gain information. In an example, a TRP 300 may include one or more antenna arrays and associated codebooks for enabling transmit and receive beamforming. The codebooks may include the parameters for tuning and phase shifting elements in the receive chain for an operational frequency. The array gain information may include the beam shape information such as depicted in FIGS. 10A and 10B. The array gain information, including the beam pattern information, may be characterized for each sub-band. The array gain distribution may include gain and direction information of at least one of the main lobes, side lobes, beam nulls, and grating lobes. The characterizations may persist as a look-up table, or may be defined as a functional relationship, based on the sub-band. The array gain information may include look-up tables or other function parameters configured to enable the server 400 such as the LMF 120 to determine AoD and AoA information for DL and UL reference signals based at least in part on the sub-bands. In an example, the LMF 120 may receive the array gain information via one or more of the array gain information messages 1204. Other messaging may also be used to provide array gain information from base stations in a communication network to one or more location servers such as the LMF 120.

At stage 1604, the method includes receiving reference signal measurement information from a mobile device. The server 400 is a means for receiving reference signal measurement information. In an example, a UE 200 may receive reference signals on a sub-band such as DL-PRSs transmitted from one or more base stations. The UE 200 may determine beam information for the received beams (e.g., PRS-ID) and may obtain measurements such as RSTD, RTT, RSSI, TDOA for the received beams. The UE 200 may be configured to provide the beam identification information, an indication of the sub-band, and the measurements to a network resource such as the LMF 120 via one or more provide measurement messages 1210. Other messaging may also be used to provide the beam and sub-band information. In an embodiment, the UE 200 may be configured to transmit UL-PRS signals to the base stations, and the base stations may be configured to provide beam, sub-band and UL-PRS measurement information to the LMF 120.

At stage 1606, the method includes determining a location of the mobile device base at least in part on the array gain information and the reference signal measurement information. The server 400 is a means for determining a location of the mobile device. In an example, the LMF 120 may determine AoD information based on the received reference signal information and the array gain information. For example, the beam identification information and the sub-band may be used to determine a AoD for the beam. The AoD values associated with a plurality of reference signals from a plurality of base stations may be used to determine a location of the UE 200 (e.g., based on the intersections of the angles). The LMF 120 may be configured to use other measurement information such as the RSSI, RSRP, RTT, TDOA measurements for the respective beams to determine the location of the UE 200.

The techniques provided herein are not limited to positioning reference signals. Other reference signals such as tracking reference signals (TRS), channel state information reference signals (CSI-RS), primary synchronization signals (PSS), secondary synchronization signals (SSS), sounding reference signals (SRS), etc. may be associated with one or more sub-bands and a TRP 300, server 400 and/or UE 200 may be configured to apply the frequency dependent beam patterns described herein.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method for determining positioning information with a mobile device, comprising:
   receiving, at the mobile device, positioning assistance data from a base station, wherein
      the positioning assistance data includes beam pattern information for a plurality of reference signals associated with at least two sub-bands, and
      the at least two sub-bands are within a bandwidth of each of the plurality of reference signals;
   receiving, at the mobile device, at least a portion of one of the plurality of reference signals, from the base station, within a sub-band; and
   determining, at the mobile device, an angle of departure value for the portion of the plurality of reference signals based at least in part on the positioning assistance data for the sub-band.

2. The method of claim 1 further comprising determining a location based at least in part on the angle of departure value.

3. The method of claim 1 wherein the sub-band is an active bandwidth part utilized by the mobile device.

4. The method of claim 1 wherein the sub-band is a resource bandwidth within an active bandwidth part utilized by the mobile device.

5. The method of claim 1 wherein the sub-band is a set of resource blocks received by the mobile device.

6. The method of claim 1 wherein the sub-band is a component carrier of the plurality of reference signals.

7. The method of claim 1 wherein the plurality of reference signals are downlink positioning reference signals.

8. The method of claim 1 wherein the positioning assistance data includes gain and direction information of at least one of a main lobe, side lobes, beam nulls, and grating lobes of each of the plurality of reference signals.

9. The method of claim 1 further comprising receiving at least a portion of a second reference signal in a second sub-band and determining an angle of departure for the second reference signal based at least in part on a frequency associated with the second sub-band.

10. A method of determining a location of a mobile device, comprising:
    receiving, at the mobile device, array gain information from a base station, the array gain information including beam pattern information for a plurality of reference signals associated with at least two sub-bands, wherein the at least two sub-bands are within a bandwidth of each of the plurality of reference signals;
    receiving, at the base station, reference signal measurement information from the mobile device; and
    determining, at the base station, the location of the mobile device based at least in part on the array gain information and the reference signal measurement information.

11. The method of claim 10 wherein the at least two sub-bands are based on bandwidth parts utilized by the mobile device.

12. The method of claim 10 wherein the at least two sub-bands are two different resource bandwidths within an active bandwidth part utilized by the mobile device.

13. The method of claim 10 wherein the at least two sub-bands are two sets of resource blocks utilized by the plurality of reference signals.

14. The method of claim 10 wherein the at least two sub-bands are at least two component carriers for the plurality of reference signals.

15. The method of claim 10 wherein the plurality of reference signals are downlink positioning reference signals.

16. The method of claim 10 wherein the array gain information includes gain and direction information of at least one of a main lobe, side lobes, beam nulls, and grating lobes of each of the plurality of reference signals.

17. A method for providing frequency dependent beam pattern assistance data to a mobile device, comprising:
    providing assistance data to one or more mobile devices from a base station, the assistance data including beam pattern information for a plurality of reference signals associated with at least two sub-bands, wherein the at least two sub-bands are within a bandwidth of each of the plurality of reference signals; and
    transmitting portions of one or more reference signals in the at least two sub-bands to the one or more mobile devices, wherein an angle of departure for each of the one or more reference signals is based at least in part on a sub-band the portions of the one or more reference signals are being transmitted in.

18. A method for network assisted positioning, comprising:
    providing array gain information to a network server from a mobile device, the array gain information including beam pattern information for a plurality of reference signals associated with at least two sub-bands; and
    transmitting one or more reference signals in a sub-band to one or more mobile devices from the network server, wherein an angle of departure for each of the one or more reference signals is based at least in part on the sub-band.

19. An apparatus, comprising:
    a memory;
    at least one transceiver;
    at least one processor communicatively coupled to the memory and the at least one transceiver and configured to:
      receive, with the at least one transceiver positioning assistance data from a base station, wherein
        the positioning assistance data includes beam pattern information for a plurality of reference signals associated with at least two sub-bands, and the at least two sub-bands are within a bandwidth of each of the plurality of reference signals;
receive, with the at least one transceiver, at least a portion of one of the plurality of reference signals, from the base station, within a sub-band; and
determine an angle of departure value for the portion of the plurality of reference signals based at least in part on the positioning assistance data for the sub-band.

20. The apparatus of claim 19 wherein the at least one processor is further configured to determine a location based at least in part on the angle of departure value.

21. The apparatus of claim 19 wherein the sub-band is an active bandwidth part utilized by the apparatus.

22. The apparatus of claim 19 wherein the sub-band is a resource bandwidth within an active bandwidth part utilized by the apparatus.

23. The apparatus of claim 19 wherein the sub-band is a set of resource blocks received by the apparatus.

24. The apparatus of claim 19 wherein the sub-band is a component carrier of the plurality of reference signals.

25. The apparatus of claim 19 wherein the plurality of reference signals are downlink positioning reference signals.

26. The apparatus of claim 19 wherein the positioning assistance data includes gain and direction information of at least one of a main lobe, side lobes, beam nulls, and grating lobes of each of the plurality of reference signals.

27. The apparatus of claim 19 wherein the at least one processor is further configured to receive at least a portion of a second reference signal in a second sub-band and determine an angle of departure for the second reference signal based at least in part on a frequency associated with the second sub-band.

28. An apparatus, comprising:
a memory;
at least one transceiver;
at least one processor communicatively coupled to the memory and the at least one transceiver and configured to:
receive, with the at least one transceiver, array gain information from a base station, the array gain information including beam pattern information for a plurality of reference signals associated with at least two sub-bands, wherein the at least two sub-bands are within a bandwidth of each of the plurality of reference signals;
receive, with the at least one transceiver, reference signal measurement information from a mobile device; and
determine a location of the mobile device based at least in part on the array gain information and the reference signal measurement information.

29. The apparatus of claim 28 wherein the at least two sub-bands are based on bandwidth parts utilized by the mobile device.

30. The apparatus of claim 28 wherein the at least two sub-bands are two different resource bandwidths within an active bandwidth part utilized by the mobile device.

31. The apparatus of claim 28 wherein the at least two sub-bands are two sets of resource blocks utilized by the plurality of reference signals.

32. The apparatus of claim 28 wherein the at least two sub-bands are at least two component carriers for the plurality of reference signals.

33. The apparatus of claim 28 wherein the plurality of reference signals are downlink positioning reference signals.

34. The apparatus of claim 28 wherein the array gain information includes gain and direction information of at least one of a main lobe, side lobes, beam nulls, and grating lobes of each of the plurality of reference signals.

35. An apparatus, comprising:
a memory;
at least one transceiver;
at least one processor communicatively coupled to the memory and the at least one transceiver and configured to:
provide assistance data to one or more mobile devices, the assistance data including beam pattern information for a plurality of reference signals associated with at least two sub-bands, wherein the at least two sub-bands are within a bandwidth of each of the plurality of reference signals; and
transmit, with the at least one transceiver, portions of one or more reference signals in the at least two sub-bands, wherein an angle of departure for each of the one or more reference signals is based at least in part on a sub-band the one or more reference signals are being transmitted in.

36. An apparatus, comprising:
a memory;
at least one transceiver;
at least one processor communicatively coupled to the memory and the at least one transceiver and configured to:
provide array gain information to a network server, the array gain information including beam pattern information for a plurality of reference signals associated with at least two sub-bands, wherein the at least two sub-bands are within a bandwidth of each of the plurality of reference signals; and
transmit, with the at least one transceiver, portions of one or more reference signals in a sub-band to one or more mobile devices, wherein an angle of departure for the portions of the one or more reference signals is based at least in part on the sub-band.

37. An apparatus for determining positioning information with a mobile device, comprising:
means for receiving positioning assistance data including beam pattern information for a plurality of reference signals associated with at least two sub-bands, wherein the at least two sub-bands are within a bandwidth of each of the plurality of reference signals;
means for receiving at least a portion of one of the plurality of reference signals within a sub-band; and
means for determining an angle of departure value for at least one of the plurality of reference signals based at least in part on the positioning assistance data for the sub-band.

38. An apparatus for determining a location of a mobile device, comprising:
means for receiving array gain information from a base station, the array gain information including beam pattern information for a plurality of reference signals associated with at least two sub-bands, wherein the at least two sub-bands are within a bandwidth of each of the plurality of reference signals;
means for receiving reference signal measurement information from the mobile device; and
means for determining the location of the mobile device based at least in part on the array gain information and the reference signal measurement information.

39. An apparatus for providing frequency dependent beam pattern assistance data to a mobile device, comprising:
means for providing assistance data to one or more mobile devices, the assistance data including beam pattern information for a plurality of reference signals associated with at least two sub-bands, wherein the at least two sub-bands are within a bandwidth of each of the plurality of reference signals; and means for transmitting portions of one or more reference signals in the at least two sub-bands, wherein an angle of departure for each of the one or more reference signals is based at least in part on a sub-band the portions of the one or more reference signals are being transmitted in.

40. An apparatus for network assisted positioning, comprising:
means for providing array gain information to a network server, the array gain information including beam pattern information for a plurality of reference signals associated with at least two sub-bands, wherein the at least two sub-bands are within a bandwidth of each of the plurality of reference signals; and
means for transmitting portions of one or more reference signals in a sub-band to one or more mobile devices, wherein an angle of departure for the portions of the one or more reference signals is based at least in part on the sub-band.

41. A non-transitory processor-readable storage medium comprising processor-readable instructions configured to cause one or more processors to determine positioning information with a mobile device, comprising:
code for receiving positioning assistance data including beam pattern information for a plurality of reference signals associated with at least two sub-bands, wherein the at least two sub-bands are within a bandwidth of each of the plurality of reference signals;
code for receiving at least a portion of one of the plurality of reference signals within a sub-band; and
code for determining an angle of departure value for at least one of the plurality of reference signals based at least in part on the positioning assistance data for the sub-band.

42. A non-transitory processor-readable storage medium comprising processor-readable instructions configured to cause one or more processors to determine a location of a mobile device, comprising:
code for receiving array gain information from a base station, the array gain information including beam pattern information for a plurality of reference signals associated with at least two sub-bands, wherein the at least two sub-bands are within a bandwidth of each of the plurality of reference signals;
code for receiving reference signal measurement information from the mobile device; and
code for determining the location of the mobile device based at least in part on the array gain information and the reference signal measurement information.

43. A non-transitory processor-readable storage medium comprising processor-readable instructions configured to cause one or more processors to provide frequency dependent beam pattern assistance data to a mobile device, comprising:
code for providing assistance data to one or more mobile devices, the assistance data including beam pattern information for a plurality of reference signals associated with at least two sub-bands, wherein the at least two sub-bands are within a bandwidth of each of the plurality of reference signals; and
code for transmitting portions of one or more reference signals in the at least two sub-bands, wherein an angle of departure for each of the one or more reference signals is based at least in part on a sub-band the portions of the one or more reference signals are being transmitted in.

44. A non-transitory processor-readable storage medium comprising processor-readable instructions configured to cause one or more processors to provide network assisted positioning, comprising:
code for providing array gain information to a network server, the array gain information including beam pattern information for a plurality of reference signals associated with at least two sub-bands, wherein the at least two sub-bands are within a bandwidth of each of the plurality of reference signals; and
code for transmitting portions of one or more reference signals in a sub-band to one or more mobile devices, wherein an angle of departure for the portions of the one or more reference signals is based at least in part on the sub-band.

* * * * *